(12) United States Patent
Bibby et al.

(10) Patent No.: US 8,810,648 B2
(45) Date of Patent: Aug. 19, 2014

(54) VISUAL TRACKING OF OBJECTS IN IMAGES, AND SEGMENTATION OF IMAGES

(75) Inventors: Charles Colin Bibby, Tollesbury (GB); Ian David Reid, Oxford (GB)

(73) Assignee: Isis Innovation Limited, Oxford (GB)

( * ) Notice: Subject to any disclaimer, the term of this patent is extended or adjusted under 35 U.S.C. 154(b) by 677 days.

(21) Appl. No.: 13/123,485

(22) PCT Filed: Oct. 9, 2009

(86) PCT No.: PCT/GB2009/002425
§ 371 (c)(1),
(2), (4) Date: Jul. 6, 2011

(87) PCT Pub. No.: WO2010/041034
PCT Pub. Date: Apr. 15, 2010

(65) Prior Publication Data
US 2011/0254950 A1 Oct. 20, 2011

(30) Foreign Application Priority Data
Oct. 9, 2008 (GB) .................................. 0818561.3

(51) Int. Cl.
*H04N 7/18* (2006.01)
(52) U.S. Cl.
USPC ....................................................... 348/135
(58) Field of Classification Search
USPC ....................................................... 348/135
See application file for complete search history.

(56) References Cited

U.S. PATENT DOCUMENTS

| 6,394,557 | B2 * | 5/2002 | Bradski | 382/103 |
| 6,590,999 | B1 * | 7/2003 | Comaniciu et al. | 382/103 |
| 2006/0115145 | A1 | 6/2006 | Bishop et al. | |
| 2007/0014462 | A1 | 1/2007 | Rousson et al. | |
| 2007/0031003 | A1 | 2/2007 | Cremers | |

OTHER PUBLICATIONS

International Search Report and Written Opinion for PCT/GB2009/002425 mailed Jan. 22, 2010 (16 pages).
UK Intellectual Property Office Search Report for GB0818561.3 mailed Jan. 20, 2009 (4 pages).
Bibby C et al.: "Visual Tracking at Sea" Robotics and Automation, 2005. Proceedings of the 2005 IEEE International Conference on Barcelona, Spain Apr. 18-22, 2005, Piscataway, NJ, USA, IEEE, Apr. 18, 2005, pp. 1841-1846.

(Continued)

*Primary Examiner* — Nhon Diep
*Assistant Examiner* — Leron Beck
(74) *Attorney, Agent, or Firm* — Procopio, Cory, Hargreaves & Savitch LLP; Noel C. Gillespie

(57) ABSTRACT

A method is discussed of tracking objects in a series of n-D images (102) that have objects (106, 108) appearing in a background (110, 112), that method comprises using a probabilistic model of the appearance of the objects and of the appearance of the background in the images, and using an evaluation of whether particular pixels in the images (102) are a part of an object (106, 108) or a part of the background (110, 112), that evaluation comprising determining the posterior model probabilities that a particular pixel (x) or group of pixels belongs to an object or to the background, and further comprising marginalising over these object/background membership probabilities to yield a function of the pose parameters of the objects, where at least the object/background membership is adjudged to be a nuisance parameter and marginalised out.

38 Claims, 17 Drawing Sheets

(56) References Cited

OTHER PUBLICATIONS

Rousson Mikael et al: "Efficient Kernel Density Estimation of Shape and Intensity Priors for Level Set Segmentation," Medical Image Computing and Computer-Assisted Intervention—MIC CAI 2005 Lecture Notes in Computer Science, LNCS, Springer, Berlin, DE, Jan. 1, 2005, pp. 757-764.

Bibby C et al: "Robust real-time visual tracking using pixel-wise posteriors," 2008, Computer Vision 10th European Conf. on Computer Vision ECCV Oct. 12-18, 2008, part 2, pp. 831-844.

Cho Wan-Hyun et al.: "Mean field annealing EM for image segmentation," Sep. 2000, Image Processing, 2000. Proceedings, 2000 International Conference on, vol. 3, Sep. 10-13, 2000, pp. 568-571.

\* cited by examiner

VISUAL TRACKING OF OBJECTS IN IMAGES, AND SEGMENTATION OF IMAGES

RELATED APPLICATIONS INFORMATION

This application claims the benefit of priority as a national stage of International Application No. PCT/GB2009/002425, filed on Oct. 9, 2009, entitled "VISUAL TRACKING OF OBJECTS IN IMAGES, AND SEGMENTATION OF IMAGES," which in turn claims priority to Great Britain Patent Application No. GB0818561.3, filed on Oct. 9, 2008, entitled "VISUAL TRACKING OF OBJECTS IN IMAGES, AND SEGMENTATION OF IMAGES," both of which are incorporated herein by reference in their entirety as if set forth in full.

BACKGROUND

1. Field of the Invention

This invention relates to the visual tracking of objects in captured digital images, and segmentation of images, and the uses of such tracking, including (but not limited to) the control of camera(s) to track object(s) as the object(s) and/or the camera(s) move.

2. Background of the Invention

Tracking objects, or targets, in a series of captured 2-D images (e.g. an image from a digital video camera, or from a digitised image produced from an analogue video camera) is a known technical field in its own right. Furthermore, many other fields use the ability to track a moving image as a given achievable thing. For example in the area of face recognition from surveillance cameras, many people simply assume that the person's face can be tracked from frame to frame and the relevant image data input to a recognition algorithm. However, automatically tracking targets in an image that move from frame to frame is not so easy. One known problem is deciding from frame to frame which pixels in each image frame are part of the object/target, sometimes termed foreground, and which are the background—i.e. "not target".

Some approaches establish a boundary that separates the target from the background in each frame. Some then use that boundary to define a shape and track the centre of the shape.

However, objects/targets can change orientation with respect to the camera acquiring the images and/or the camera can move relative to the target. The target can get closer or further away, and it can change pose, or orientation, relative to the camera. So the target can look quite different as judged by its boundary in a captured image from time to time. It is therefore not desirable to have a fixed, single, predicted shape for the target boundary shape. Some people have tried using models that have boundaries that evolve over time, from one captured frame to a different captured frame, to enable the target to be recognised as such and tracked Fast and reliable visual tracking is a prerequisite for a vast number of applications in computer vision. Though it has been the subject of intense effort over the last two decades, it remains a difficult problem for a number of reasons. In particular, when tracking previously unseen objects, many of the constraints that give reliability to other tracking systems—such as strong prior information about shape, appearance or motion—are unavailable. One technique that has shown considerable promise for its ability to perform tracking and segmentation within a unified framework is the use of an implicit contour, or level-set to represent the boundary of the target. As well as handling topological changes seamlessly, tracking using level-sets can be couched in a fairly standard probabilistic formulation, and hence can leverage the power of Bayesian methods.

One technical difficulty is finding in an image where the object is located. A second technical difficulty is dealing in changes in the apparent shape of an object caused by changes in the relative position and orientation of the object and the image-acquiring camera.

Solutions in the past include that discussed in U.S. Pat. No. 6,394,557 (Leroi) and U.S. Pat. No. 6,590,999 (Comaniciu). Also known is reference [4] (see list of references). The reader of this patent is hereby instructed to read those three documents. We feel this will assist in understanding the present invention. None of these three documents are quite what we think is needed.

SUMMARY

According to a first aspect the invention comprises a method of tracking objects in a series of n-D images that have objects appearing in a background comprising using a probabilistic model of the appearance of the objects and of the appearance of the background in the images, and using an evaluation of whether particular pixels in the images are a part of an object or a part of the background, that evaluation comprising determining the posterior model probabilities that a particular pixel belongs to an object or to the background, and further comprising marginalising over these object/background membership probabilities to yield a function of the pose parameters of the objects, where at least the object/background membership is adjudged to be a nuisance parameter and marginalised out.

This approach has been found to give a more reliable ability to track an object. There are fewer false local minima/maxima in the objective functions being solved than in other approaches, and this results in fewer occasions where the tracker system loses the object.

According to a second aspect the invention comprises a method of segmenting objects in a series of n-D images that have objects appearing in a background comprising using a probabilistic model of the appearance of the objects and of the appearance of the background in the images, and using an evaluation of whether particular pixels in the images are a part of an object or a part of the background, that evaluation comprising determining the posterior model probabilities that a particular pixel belongs to an object or to the background, and further comprising marginalising over these object/background membership probabilities to yield a function of the shape of the objects, where at least the object/background membership is adjudged to be a nuisance parameter and marginalised out.

The inventive concept can be applied to segmenting images, as well as tracking. The segmentation method is better because of the improved objective function and it therefore makes fewer mistakes than many known methods.

According to a third aspect the invention comprises a method of tracking and segmenting objects in a series of n-D images that have objects appearing in a background comprising using a probabilistic model of the appearance of the objects and of the appearance of the background in the images, and using an evaluation of whether particular pixels in the images are a part of an object or a part of the background, that evaluation comprising determining the posterior model probabilities that a particular pixel belongs to an object or to the background, and further comprising marginalising over these object/background membership probabilities to yield a function of the shape and pose parameters of the objects, where at least the object/background membership is adjudged to be a nuisance parameter and marginalised out.

The inventive concept can be applied to the simultaneous tracking and segmentation of images. This is the preferred solution as the tracking accounts for rigid/projective motion between images whilst the segmentation accounts for any residual shape deformation. The improved quality of the objective function means that the result is a robust, real-time tracking system capable of tracking previously unseen targets in a superior fashion to state-of-the-art.

In many embodiments the model of the appearance of the objects, or object, and/or the model of the appearance of the background will or can evolve over time.

In some embodiments of the invention we use a pixel-wise evaluation of whether particular pixels in the images are part of an object or are a part of the background. In other embodiments we do not. Pixel-wise evaluation is evaluating independently per pixel in the image. Non-pixel-wise evaluation of the posterior can be envisaged (just pixel-posterior evaluation: an evaluation is done for each pixel, but not necessarily independently per pixel). For example, an evaluation could be done using pairs of pixels, or groups of pixels, as opposed to independently evaluating each pixel independently.

It will also be appreciated that in many examples the marginalising over the object/background membership probabilities to yield a function of the shape and pose parameters of the objects has the "pose" being the transformation from the object co-ordinate frame to the image co-ordinate frame, such as the image position of the object, or the position rotation and scale. In the embodiments above, the tracking and segmentation process is accomplished by finding the optimal pose and shape parameters by minimising or maximising this function.

Preferably, the method (any of the above methods), performs an evaluation of equation (3) followed by an evaluation of equation (4), wherein:

Equation (3) is:

$$P(M_j \mid y) = \frac{P(y \mid M_j)P(M_j)}{\sum_{\{i=f,b\}} P(y \mid M_i)P(M_i)} \quad j = \{f, b\}$$

and Equation (4) is:

$$P(\Phi, p \mid x, y) = \frac{1}{P(x)} \sum_{\{i=f,b\}} \{P(x \mid \Phi, p, M_i)P(M_i \mid y)\}P(\Phi)P(p)$$

And $$P(\Phi, p \mid x, y) = \frac{1}{P(x)} \sum_{\{i=f,b\}} \{P(x \mid \Phi, p, M_i)P(M_i \mid y)\}P(\Phi)P(p)$$

i can be either foreground f or background b $P(M_i)$ is the prior probability of the model e.g. what is the chance of seeing a foreground pixel without taking into account any extra information.

$P(y|M_i)$ is the likelihood of seeing the pixel value y given the model $M_i$ e.g. what is the probability of seeing a red pixel given that we know it came from the foreground model.

$P(M_i|y)$ is the posterior of the model $M_i$ given the pixel value y e.g. what is the chance the pixel came from the foreground model given that it is red.

$P(x|\Phi, p, M_i)$ is the likelihood of the pixel location x given the shape, the pose p and the model $M_i$ e.g. what is probability the foreground object, shaped like a car and located in the centre of the image generated a pixel in the top left corner of the image (unlikely).

$P(\Phi)$ is prior probability of the shape e.g. if we knew before hand that we are trying to track a car then something that looks like a circle is unlikely; whereas, something rectangular is more likely.

$P(p)$ is the prior probability of the pose p e.g. how likely is it that the object is in the top left of the image.

$P(x)$ is the probability of pixel location x e.g. every possible pixel location is equally likely.

$P(\Phi, p|x, y)$ is the posterior probability of the shape and the pose p given the pixel location x and the pixel value y e.g. how likely is it that the shape is like a car located in the top right corner of the image given that there is a green pixel in the top right corner.

This image processing technique allows us to average out the effect of unwanted parameters from the image processing calculations, which makes the subsequent calculations easier to perform and produces improved results.

Preferably the images are modelled using a bag-of-pixels model. This reduces the need to have prior knowledge of the object or background and makes the image processing more capable of handling unknown situations (in particular changes in viewpoint).

We prefer to use a non-parametric distribution for image values. This can handle some situations better because it is easier to represent a general probability distribution using a non-parametric representation. The non-parametric distribution may comprise:

(i) a colour histogram, or other relative probability, of particular colours appearing in the object and/or (ii) a colour histogram, or other relative probability, of a particular colour appearing in the background.

The method may comprise using an invertible parametric registration, possibly an invertible linear transformation, of an object between different images (such as a rigid, affine or perspective transformation), followed by segmentation of the object from the background to account for non-rigid shape deformations of the object boundary.

The projection of the boundary of a rigid 3-D object will behave non-rigidly in the image, even though the underlying object may have a rigid shape. We account for changes in the boundary shape, not the underlying shape.

The method may comprise using a rigid registration of an object between different images, followed by segmentation of the object from the background to account for non-rigid shape deformations of the object.

The method may comprise determining the pose of the object in a first image and determining the pose of the object in a second image using the pose, or an evolution of its pose, derived from the first image. Using an assessment of the pose of the object is how we track an object, in some embodiments.

A level-set of an embedding function may be used to represent the object shape, and a prior condition may be imposed on the embedding function constraining the embedding function to be an approximate signed distance function. We have found that this helps condition the optimisation well.

According to another aspect the invention comprises an image tracking system having:—

(i) a processor adapted to run an image tracking algorithm;

(ii) an input to the processor adapted to receive digital pixel data signals representative of pixels of a series of images having a target and background;

(iii) an output from the processor adapted to output processed signals which are derived from operating on the input signals with the tracking algorithm; wherein the image tracking algorithm uses a probabilistic evaluation of posterior probabilities that particular pixels are pixels of the object or pixels of the background and wherein the tracking algorithm is adapted to marginalise out, over the pixel data processed, at least one nuisance parameter from a model of the appearance of the object,
or
an image segmenting system comprising:—

(i) a processor adapted to run an image segmenting algorithm;

(ii) an input to the processor adapted to receive digital pixel data signals representative of pixels of a series of images having a target and background;

(iii) an output from the processor adapted to output processed signals which are derived from operating on the input signals with the image segmenting algorithm; wherein the image segmenting algorithm uses a probabilistic evaluation of posterior probabilities that particular pixels are pixels of the object or pixels of the background and wherein the segmenting algorithm is adapted to marginalise out, over the pixel data processed, at least one nuisance parameter from a model of the appearance of the object.

The system may have a camera having one or more of a pan, or tilt, or zoom capability, and wherein the output from the processor may be used by a camera control mechanism to control one or more of the pan, or tilt, or zoom of the camera automatically, without human intervention, responsive to the processor tracking the target in the images. This allows us to have cameras which automatically track an object to keep it in their field of view.

According to another aspect the invention comprises a method for real-time tracking of a non-rigid foreground object in a sequence of images having a foreground object in a background, comprising representing the foreground object by a probabilistic appearance model (for example a colour or texture distribution) which can evolve over time, and representing the background by a probabilistic appearance model which can evolve over time, and wherein the tracking method uses an optimisation that finds a foreground object region in an image by maximising the discrimination between the foreground and the background by finding the optimal pose (i.e. transformation from the object coordinate frame to the image coordinate frame, such as the image position of the object, or the position, rotation and scale) of the object in the image and wherein in each frame the result of the optimisation is a probabilistic boundary between the foreground and background (e.g. a contour or contours in a 2D), the pose parameters of the boundary relative to the object coordinate frame, and the appearance models of the foreground object and background.

The method may further comprise finding local shape deformations not accounted for by the pose transformation, and/or updating the appearance models of both foreground and background.

According to another aspect the invention comprises a method for real-time tracking of a non-rigid foreground object in a sequence of images comprising: (i) in a first image of the sequence, identifying the region of an image covered by the foreground object and a background region outside the object, and developing probabilistic appearance models for the foreground object region and the background region; (ii) for the next image in the sequence, for each pixel "i" in the image, computing the probability that it is foreground or background pixel (variable "M"), given a pixel value y, i.e. $P(M|y(i))$; these values representing the posterior foreground/background membership for every pixel in the absence of any pose or shape information; (iii) using a prediction of the object pose, maximising the probability distribution $P(p,\Phi|x, y)$ with respect to the pose parameters p, that distribution representing belief in the pose p of the foreground object, and its shape $\Phi$, given a pixel position x and pixel value y, the maximising of $P(p, \Phi|x, y)$ being computed by marginalising over the posterior foreground/background membership probabilities of each pixel in the image.

The method may further comprise a step (iv) of optimising $P(p, \Phi|x, y)$ with respect to $\Phi$ to determine the new object shape; and/or a step (v) of updating the appearance models by fusing the pre-existing foreground and background appearance distributions with the appearance distributions in the current image, and/or repeating the steps (ii) to (v) for subsequent images in the sequence.

We may initialise an objects location by a user defining a region, optionally a closed loop such as a ring or an elliptical region, of foreground to define the appearance model if the object and initial object location, the background being acquired by considering a region outside the user-defined region and wherein steps (iv) and (v) are iterated to extract the shape which best separates background from foreground as determined by maximising $P(p, \Phi|x,y)$. The object location may be initialised by an automatic detection/recognition module (e.g. a face detector)

The object location in a subsequent image frame may be predicted based on its previous location and a model of its expected motion.

A or the optimisation step for the pose p may be achieved using Newton-Raphson technique, and/or or the shape $\Phi$ may be optimised by using calculus of variations.

In some embodiments, only those pixels are considered that are in a narrow band around the predicted boundary contour separating object from background. This reduces the processing burden.

Pose parameters may be adjusted using closed-loop control to keep the object centred in its original coordinate frame by accounting for drift caused by shape variations. The appearance models may be updated via a weighted running average of the previous model and the current appearance. The method may comprise using the best pose parameters p to develop a control signal to control the pose parameters of a robotic device. The robotic device could be a pan-tilt-zoom camera device and the control signal may be intended to keep the object in the field of view of the camera.

The best pose parameters p could be used to provide a control signal to a virtual world or augmented reality subsystem and/or the best pose parameters p might be used to extract a stabilised view of the foreground object.

The method may have the images being 3-D images, such as MRI or CT, and the probabilistically determined boundary between background and foreground could be a surface. For example, in medical imaging, the method could be used to image a body structure, such as an organ, and the object/background could be the boundary of the organ/structure—for example the inside or outside surface of a physiological structure of object in a patient. The boundary may delineate an interior and an exterior of some object of interest.

According to another aspect, the invention comprises tracking of a non-rigid foreground object in a sequence of images having a foreground object in a background, wherein the tracking method uses an optimisation that finds a foreground object region in an image by maximising the discrimination between the foreground and the background by finding the optimal pose (i.e. transformation from the object coordinate frame to the image coordinate frame, such as the image position of the object, or the position, rotation and scale) of the object in the image and wherein in each frame the result of the optimisation is a probabilistic boundary between the foreground and background (e.g. a contour or contours in a 2D), the pose parameters of the boundary relative to the object coordinate frame, and the appearance models of the foreground object and background.

The probabilistic appearance model may be given by:
(i) a parametric colour or texture distribution; or
(ii) a histogram.

According to another aspect the invention comprises a visual tracking system for tracking a foreground object in a series of images, that marginalises over a foreground/background segmentation using the posterior probabilities of foreground/background membership of image pixels, and which optimises pose parameters of the object.

According to another aspect the invention comprises a computer program encoded on a computer-readable data carrier which when run on a computer processor performs the method of any of the preceding methods.

Embodiments of the invention will now be described by way of example only with reference to the accompanying drawings, of which:—

DETAILED DESCRIPTION

Section 1 Overview

Whilst the technical detail of how we perform at least the task of delineating object from background is a significant advance over the prior art, and is the provider of technical advantages over technical problems in the prior art, it will be helpful to set the scene for the invention. There follows a discussion of the overall aim of the method and apparatus.

In many embodiments of the invention/practical applications of the invention, the overall aim is to control or modify something using an output from image processing. That "something" can be to control the movement of a camera to track an object in a field of view of the camera. That "something" can be to control or modify a digital video or image signal to centre an object in the image (or otherwise control its position in the image). That "something" can be to stabilise a digital video or series of images to reduce the effect on the images of camera shake or other relative movement between the object to be observed and the camera. Examples of such areas include acquiring images from a camera in a moving vehicle (or hand-held cameras), or face/person tracking, or radar or sonar images, to remove unwanted clutter, or in the field of medical images where the camera may move, or the object may move (e.g. a part of a beating heart).

The processed images (or image-data) obtained from the present invention may themselves be further image processed—for example object recognition may be applied to an enhanced/improved captured image.

Figure 1A:
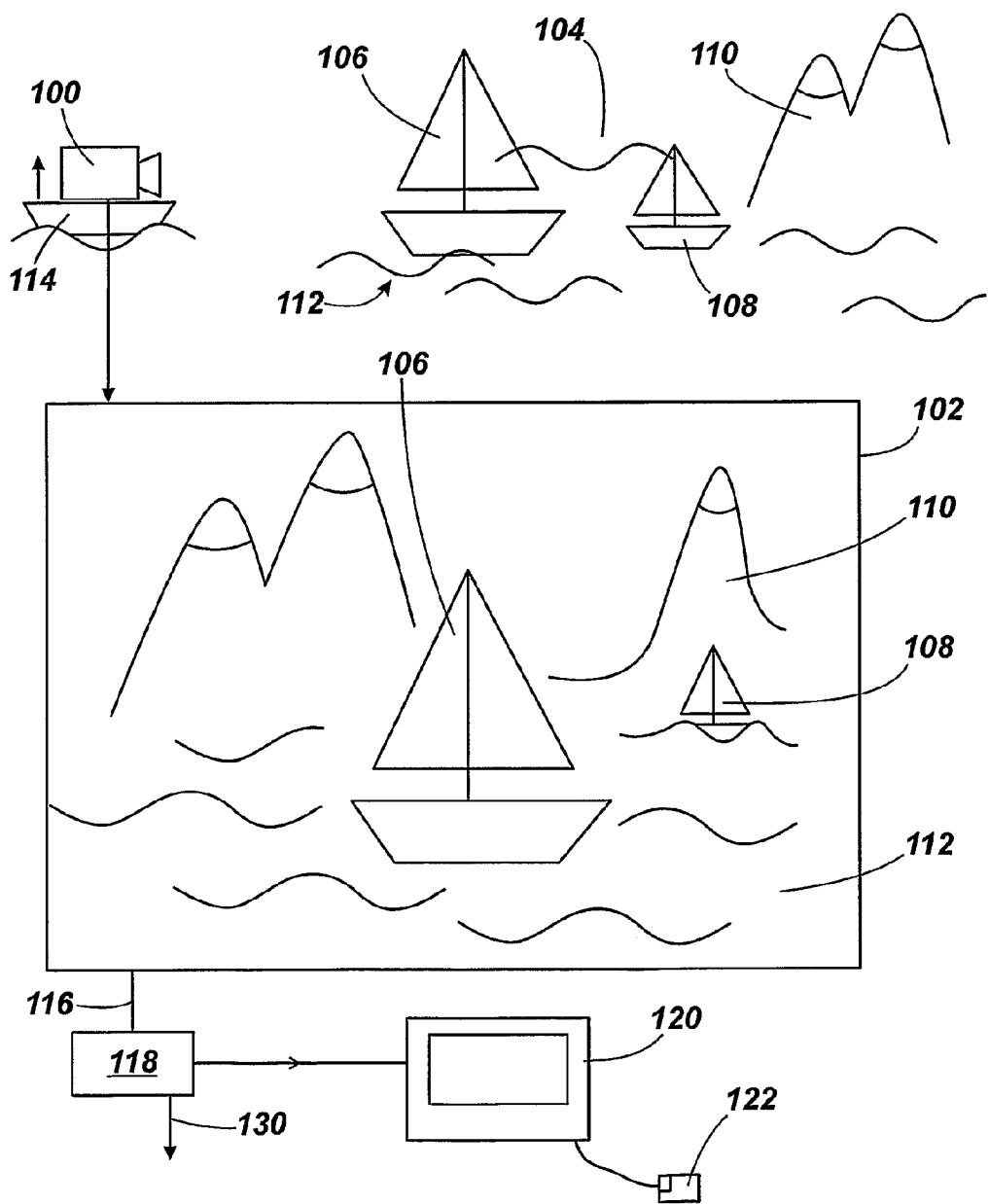
FIG. 1A is a schematic representation of an image tracking camera system including a pan/tilt/zoom camera and an image tracking processor.

FIG. 1A schematically shows a digital video camera 100 acquiring a digital image 102 of a scene 104 which has in view a first boat 106, a second boat 108, some mountains/coastline 110, and some waves 112.

The aim is to track the boat 106 in the video images, as the boat moves around, and as other boats get in the way, as waves partially obscure the target boat, and as the target boat changes orientation or pose with respect to the camera. The camera 100 is itself mounted on another boat 114. An output signal 116 of the camera 100 is fed to an image processor 118 which has display screen 120 and an input device (e.g. mouse) 122.

The image 102 is displayed on the screen 120. A user of the image processor 118 identifies the object to be tracked in the image 102 using the input device 122. In this example they do this by defining an object reference frame 124 around the boat 106. For example, they may produce a rectangular frame around it by clicking the mouse and dragging the curser to define the opposite diagonals of a rectangle (see FIG. 1B), the rectangle of the object reference frame being shown as dotted line 126.

Figure 1B:
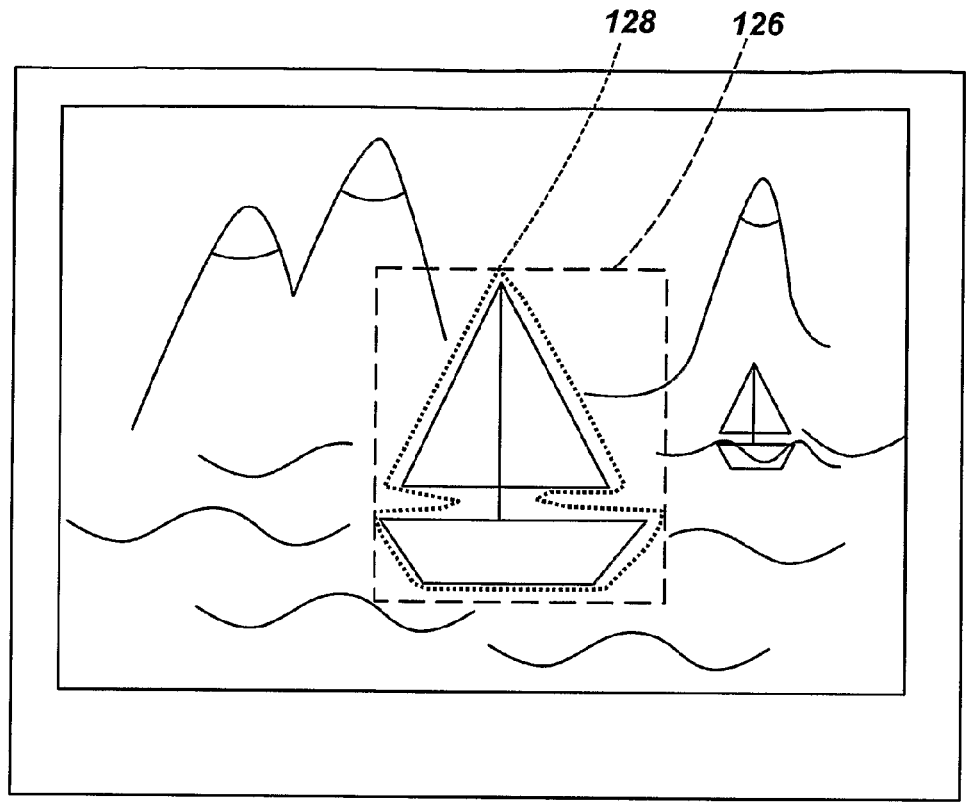
FIG. 1B is a schematic representation of an image acquired by the system of FIG. 1A, with some image processing applied to it.
Figure 1C:
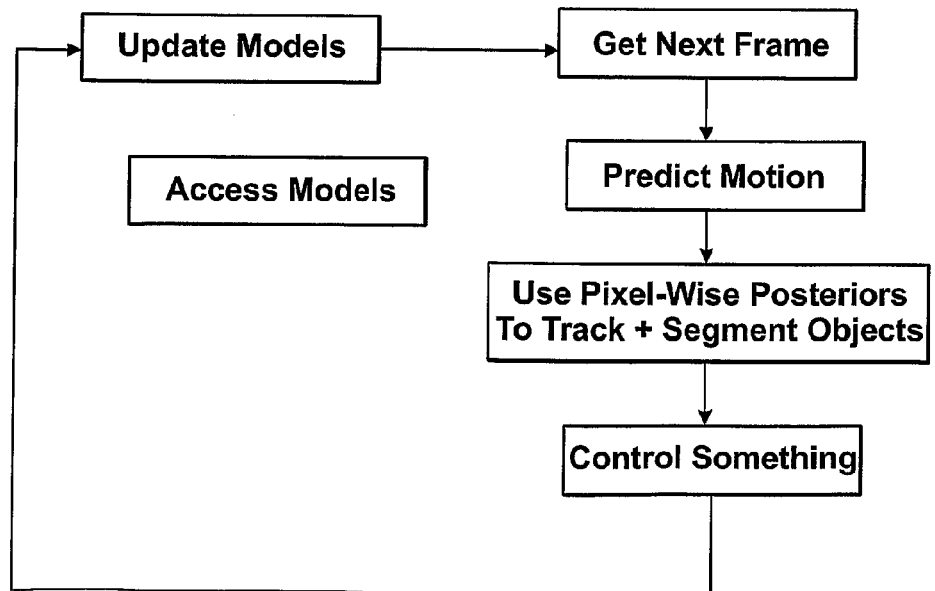
FIGS. 1C and 1D is flow charts of operations performed by the system of FIG. 1A.
Figure 1D:
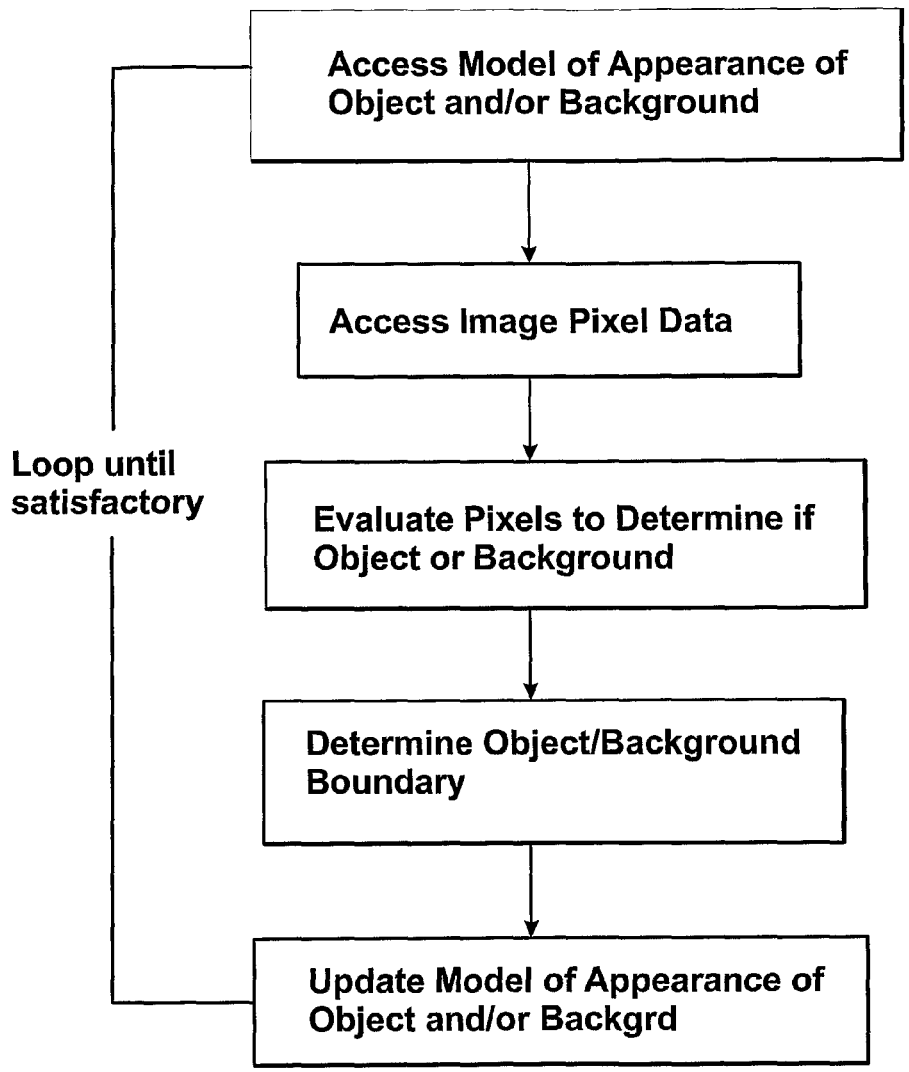

The processor 118 then determines what is the object or target to be tracked and what is background. The user may also input some extra information, or more extra information may be input/may exist for the processor 118. For example, the target may be (almost certainly will be) a different colour from the background, or have a main colour. That colour can be input, or selected from a colour palate for example, as "target", and that prior information used by the processor 118 to define a boundary 128 between the target/object 106 and the background. The boundary 128 may be shown on the display 120 (or on a processed image elsewhere), or it may not. It is shown in FIG. 1B as dotted line 128.

In fact, we believe that choosing a single colour as a model parameter is not the best approach. We prefer to use a more sophisticated, and more general, approach of using a colour histogram as part of the foreground/target/object model (and often also a colour histogram in the background model). The colour histogram records the frequency of occurrence of each colour in the foreground/object region. In the colour histogram approach the user does not have to enter colour information. The user (person) or the processor may input/choose the colour of the target.

The processor 118 starts by assuming that the boundary 128 is circular or ellipsoidal and iteratively modifies the boundary until it is resolved accurately enough for the processor to stop iterating. The techniques used to delineate target from background lie in the improved technical area of the present invention.

As different camera/video frames of image 102 are acquired and processed by processor 118 the 2-D position of the object in the acquired image 102 moves, or would tend to move if no correction were made. The processor can, over time, predict where the object is likely to have moved from one captured image to be processed to the next captured image to be processed. (The image processor probably processes every captured image, but if that is not necessary it may process only some spaced apart in time images, e.g. every 4$^{th}$ one. It depends upon how fast the image is moving/what level of correction is required).

The image processor conceptually moves the starting position of the determined boundary 128 to the predicated new position of the target in the new captured image and iterates the routine for delineating the image from the background again. This may result in a new boundary shape, which is used for the next image to be processed.

At each, or some, determination of the boundary 128 for a target/object in a frame the processor 118 updates an appearance model of the object, stored in fast access memory and an appearance model of the background, stored in fast access memory. Therefore the model of the object used to determine whether any particular near boundary pixels are object or background is updated for each new frame, and between each image frame processed. In a less than optimal system we could image process less than every frame captured by an image capturer.

The processor 118 can process the images as fast as the frame rate of the camera 100. Using cheap processors we can handle frame rates of at least 50-100 Hz without significant difficulty.

The processor 118 also outputs a control signal 130 which is derived from the processing of the captured images and which can be used to centre the object in the captured image by controlling the movement of the camera 100. Or it could be used to generate a stabilised image of the object, possibly centred in the processed image, for display or for storage, or for subsequent processing. The control signal can be generated easily from the transformation from the image to the reference frame. There are various ways of doing the control, all of which are well understood by the skilled man in the field. Exactly how the control signal is generated will depend on what form of control is being used. Typically for control of a pan-tilt device, we would find the distance of the object to the centre of the image and either adjust the position of the cameral to re-centre it, or instead set the velocity of the camera based on the distance to the image centre.

The general field of robotic control using visual input is known as visual servoing, and is an established technical field.

The object reference frame 124 defines the orientation, scale and position of the foreground/target object. If the object stays in the same location but rotates, the reference frame will rotate. This known rotation can be used to stabilise the images (by applying the inverse). In general, the reference frame defines the pose of the object and is implemented using a coordinate transformation. This coordinate transformation would typically be a member of a group, meaning it has an inverse to transform back the other way) and certain other useful properties. In our implementation the most general group transformation we currently deal with is a homography, which is a linear transformation having 8 degrees of freedom and can be represented using a 3×3 homogeneous matrix. However in most of our experiments we have used a similarity transform, which is a transformation that permits translation (change of position), rotation, and scale. It too, can be represented by a 3×3 matrix, but of the restricted form:

$$\begin{pmatrix} s \times \cos(\theta) & -s \times \sin(\theta) & x \\ s \times \sin(\theta) & s \times \cos(\theta) & y \\ 0 & 0 & 1 \end{pmatrix}$$

Where theta is the rotation, x-y is the translation and s is the scale.

By way of comparison, in U.S. Pat. No. 6,590,999 the pose is simply the x-y position in the image. Of course in this situation the reference frame would seem to be irrelevant. There are many applications where it is important not only to know where the object is, but also its attitude or pose. U.S. Pat. No. 6,590,999 cannot find the rotation, nor any of the other parameters we could encode in a 3×3 invertible linear transformation.

Turning to the task of delineating object/target form background in more detail, our method and apparatus can handle tracking more than one region simultaneously (it is possible to set up multiple targets, e.g. by setting up multiple target registration frames). We require minimal, or even no prior knowledge of the targets prior to tracking.

One embodiment of the tracker was developed with the aim of tracking either vessels or other targets within a maritime environment from video or infra-red data, or for tracking people (bodies or faces) in CCTV footage within a surveillance context, with a view to real-time control of robotic pan-tilt-zoom devices. Nevertheless there are numerous other potential applications of the invention.

According to one aspect of the invention we provide a Robust Real-Time Visual Tracking system using Pixel Foreground/Background Membership Posterior probabilties to track a target in a series of images.

We can derive a probabilistic framework for robust, real-time, visual tracking of previously unseen objects from a moving camera. The problem of tracking an object in the images is handled using a bag-of-pixels representation of the object/background. In some embodiments the method comprises a rigid registration between frames, a segmentation of the images to identify target from background, and online appearance learning. The registration between frames can be used to compensate for rigid motion. Segmentation of the object model can be used to model any residual shape deformation. The online appearance learning provides continual refinement of both an object appearance model and a background appearance model. The key to the success of our method is the use of pixel posteriors in the probability model of the object/background, as opposed to likelihoods (as the prior art uses). We have demonstrated a superior performance of our tracker by comparing cost function statistics against those commonly used in the visual tracking literature. Our comparison method provides a way of summarising tracking performance using lots of data from a variety of different sequences.

We have a novel system and method for combined tracking and segmentation, which, as well as capturing the desirable properties of level-set based tracking, is very robust and in many embodiments runs in a few milliseconds on standard hardware. We base our method on a generative model of image formation that represents the image as a bag-of-pixels. The advantage of such a model—in common with other simpler density-based representations such as colour-histograms—is the degree of invariance to viewpoint this confers. We derive a probabilistic, region based, level-set framework, which comprises an optimal rigid registration, followed by a segmentation to re-segment the object and account for non-rigid deformations. Aside from issues of speed (which are not addressed in [4]) there are a number of differences between [4] and our work, some of which stem from the generative model we use for image data (see Sect. 2). First, our derivation gives a probabilistic interpretation to the Heaviside step function used in most region based level-set methods [7, 4]. Second, given this interpretation we propose a pixel posterior term, as opposed to a likelihood, which allows us to marginalise out model parameters at a pixel level. As we show in Sect. 2, this derives naturally from our generative model, and is a subtle but absolutely crucial difference between our method and others e.g. [4, 2, 3], as our results show in Sect. 7. Third, in contrast to [7, 4] and similar to [8, 9] we assume a non-parametric distribution for image values as opposed to a single Gaussian (for an entire region). Finally, we introduce a prior on the embedding function which constrains it to be an approximate signed distance function. We show that this gives a clean probabilistic interpretation to the idea proposed by [10] and avoids the need for reinitialisation of the embedding function that is necessary in the majority of level-set based approaches. Our work also bears, with hindsight, some similarity to [11] who sought the rigid transformation that best aligns a fixed shape-kernel with image data using the Bhattacharyya coefficient. This work extended the pioneering work of this type [12, 13] to handle translation+scale+rotation as opposed to translation only or translation+scale. In contrast to [11], however, we allow the shape to change online and propose a novel framework using pixel posteriors, which removes the cost of building an empirical distribution and testing it with the Bhattacharyya coefficient. This has a second hidden benefit as it avoids the need to build a 'good' empirical distribution given limited data; we find in practice this gives a significant improvement over [12, 13, 11]. Unlike [4], [8, 9] use a non-parametric distribution for image data. They derive contour flows based on both KL-divergence and the Bhattacharyya coefficient. Though they demonstrate that both are effective for tracking, they do not model rigid transformation parameters explicitly: they must recompute their non-parametric distributions at every iteration, and—as we show in Sect. 7—objectives based on the Bhattacharyya coefficient are inferior to the one we use. Finally, it is worth mentioning template based tracking methods (see [14] for an excellent summary of past work). We include an ideal SSD cost in our comparative results (Sect. 7), which uses the correct template at each frame. Though this unfairly advantages the SSD method—since in reality the exact template is never available—it does suggest that in future there would be benefit in considering how spatial information can be incorporated.

One problem with template tracking is how to adapt the template over time. Within our framework (and other similar work), because the segmentation is performed rapidly and reliably online, the appearance and shape models of the object can be updated over time without suffering from the significant problems of drift that plague other algorithms. Our framework is general enough to be extended to various types of prior information and various imaging modalities, but for the examples discussed now we restrict ourselves to the problem of tracking the 2D projections of either 2D or 3D objects in ordinary colour video.

In summary, the key benefits of our method are: (i) an extensible probabilistic framework; (ii) robustness—given by pixel posteriors and marginalisation; (iii) real-time performance; (iv) excellent cost function characteristics; (v) no need to compute empirical distributions at every frame; (vi) online learning (i.e. adaption of appearance and shape characteristics); (vii) flexibility to track many different types of object and (viii) high invariance to view and appearance changes.

Section 2, below, describes the representation of the object being tracked and derives a probabilistic framework from a simple generative model; Section 3 outlines the level-set segmentation; Section 4 shows the registration process; Section 5 describes our method for dealing with drift; Section 6 outlines the online learning process; Section 7 shows our results and Section 8 concludes with a summary and discussion.

Section 2 The Generative Model

The following detailed discussion is addressed to the man skilled in the area—it is quite mathematical, but then so is the man skilled in the area.

Figure 1F:
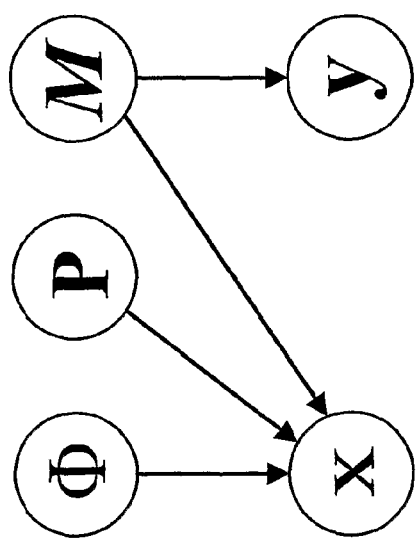
FIG. 1F illustrates a generative bag-of pixels model for the image obtained by a camera.
Figure 1E:
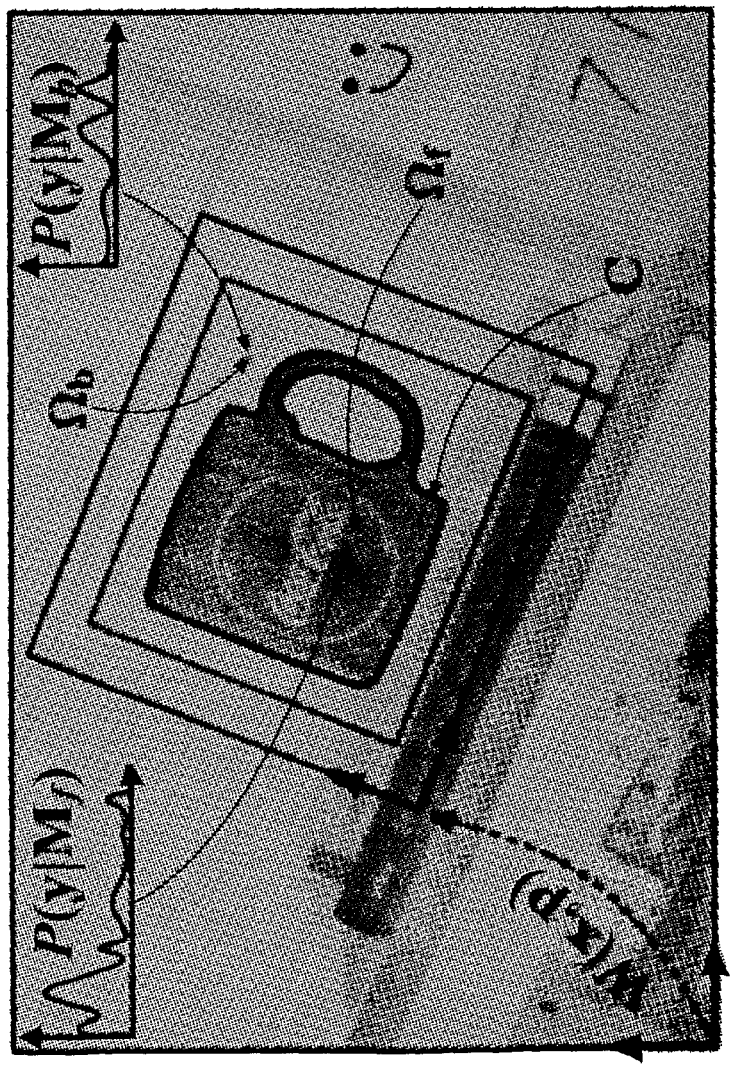
FIG. 1E is a representation of a contour of an object.
Figure 2A:
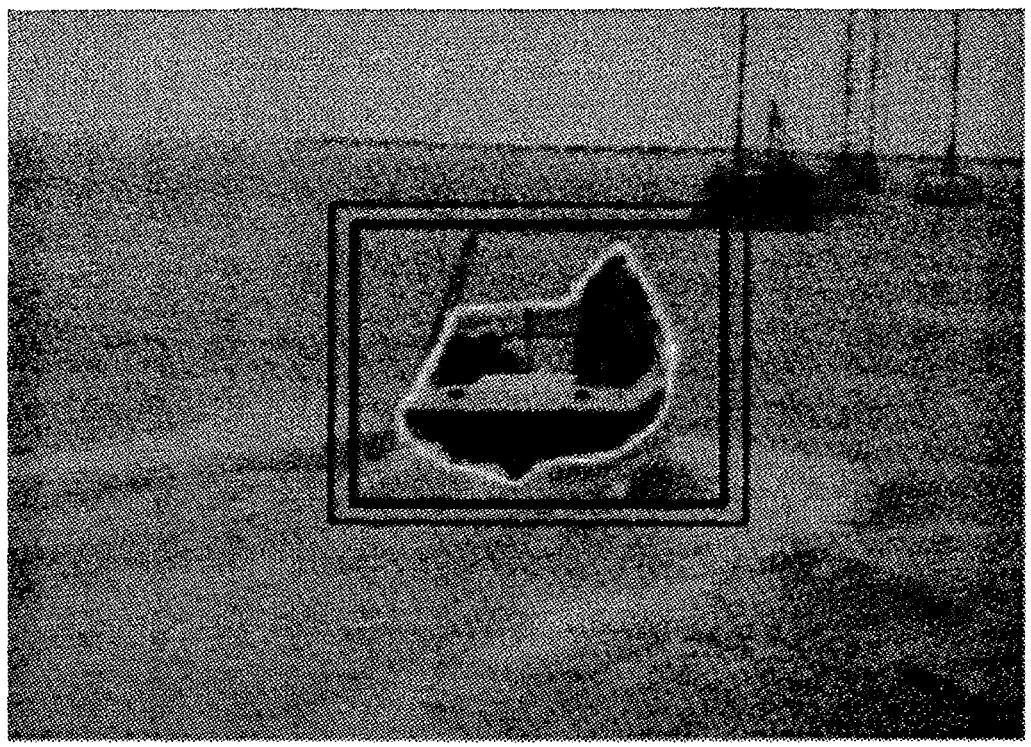
FIGS. 2A to 2D show frames from a series of digital video frames showing the tracking of one moving boat with a camera mounted in another moving boat.
Figure 2B:
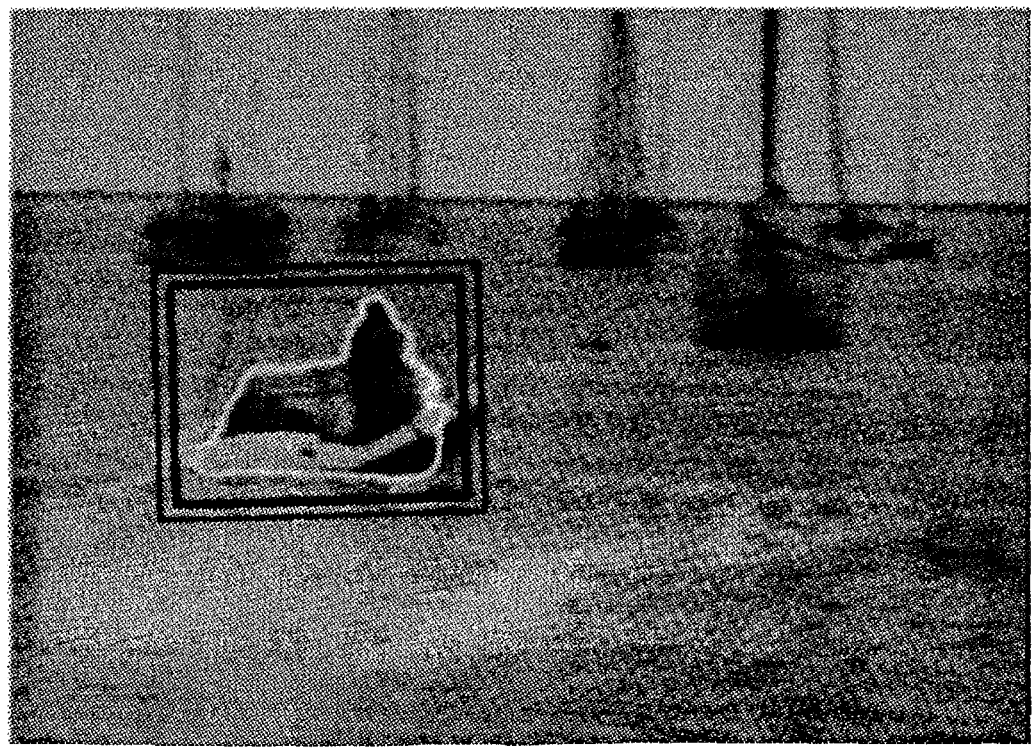
Figure 2C:
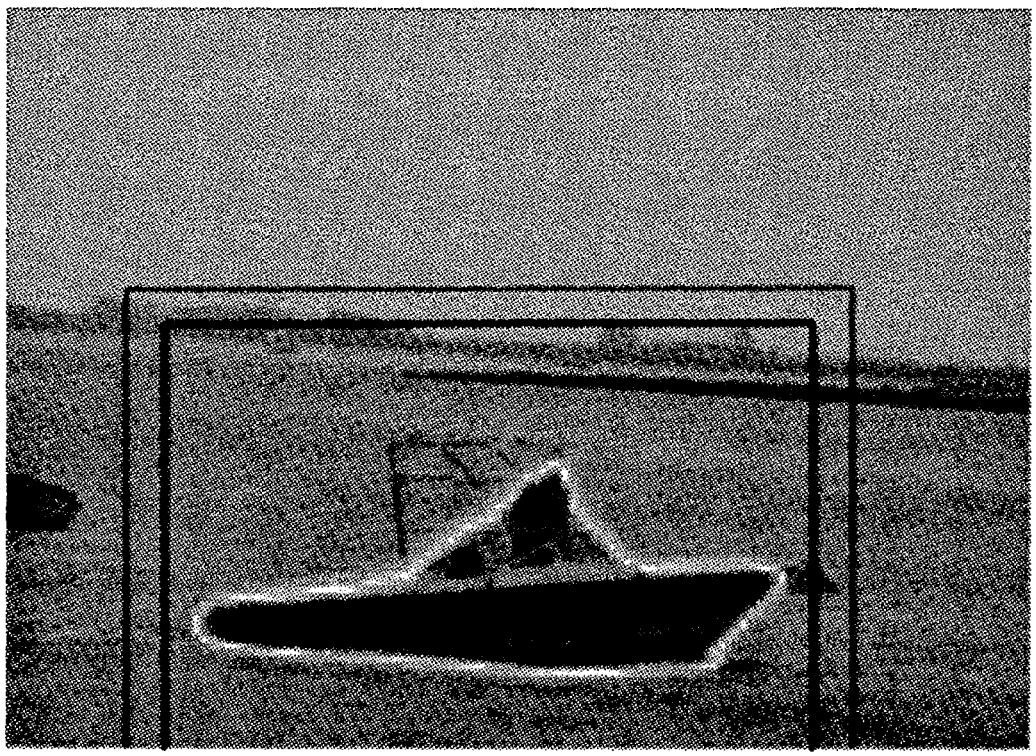
Figure 2D:
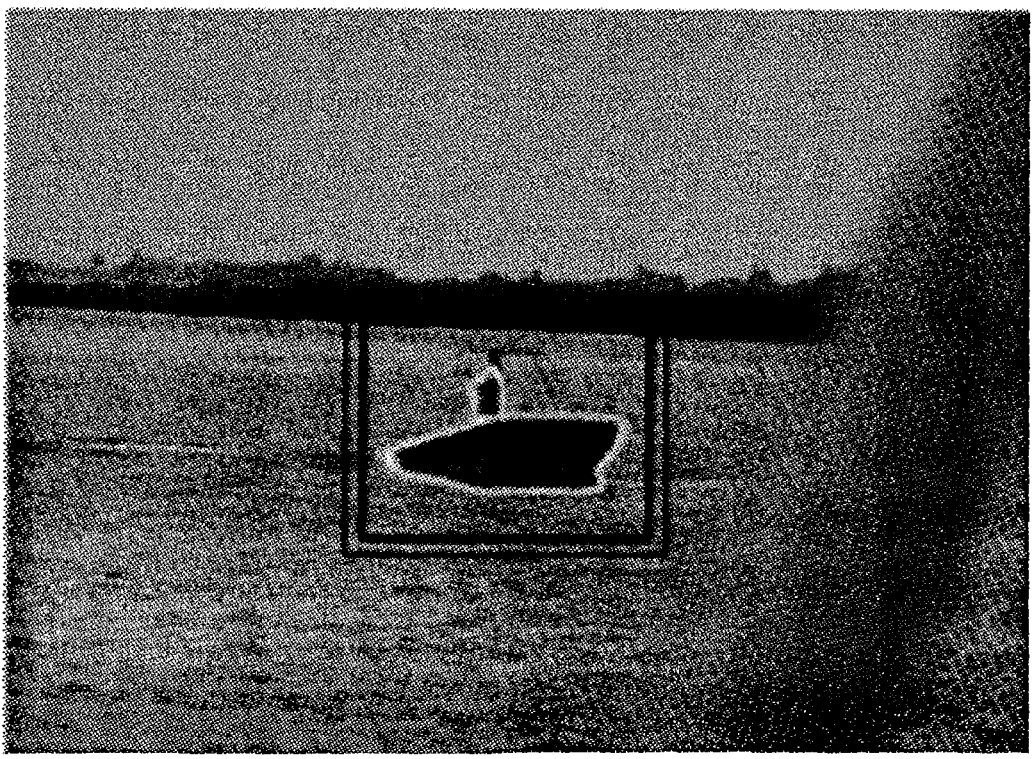
Figure 2E:
FIG. 2E-2H show the tracking of a human head in different image frames.
Figure 2F:
Figure 2G:
Figure 2H:
Figure 2I:
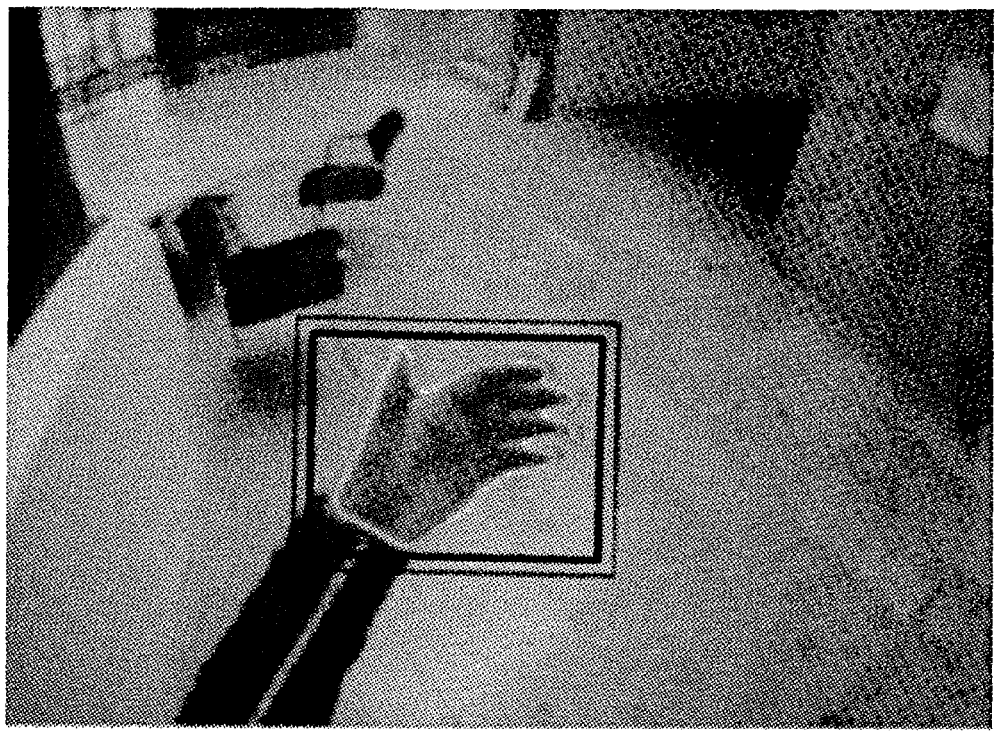
FIG. 2I-2L show the tracking of a human hand in different frames of a video.
Figure 2J:
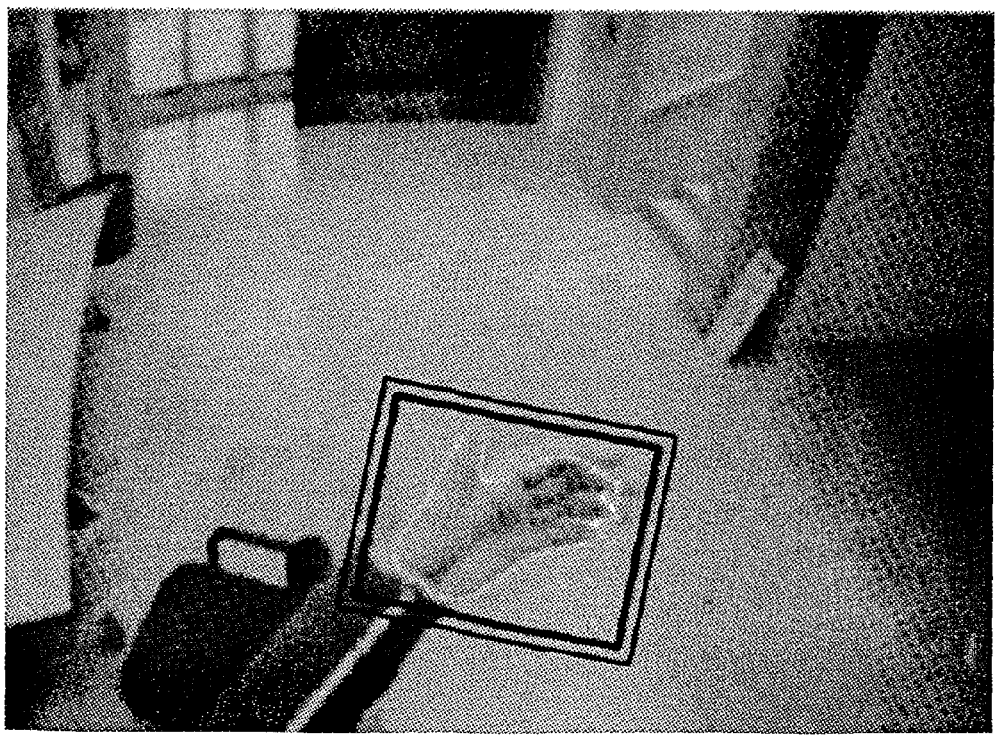
Figure 2K:
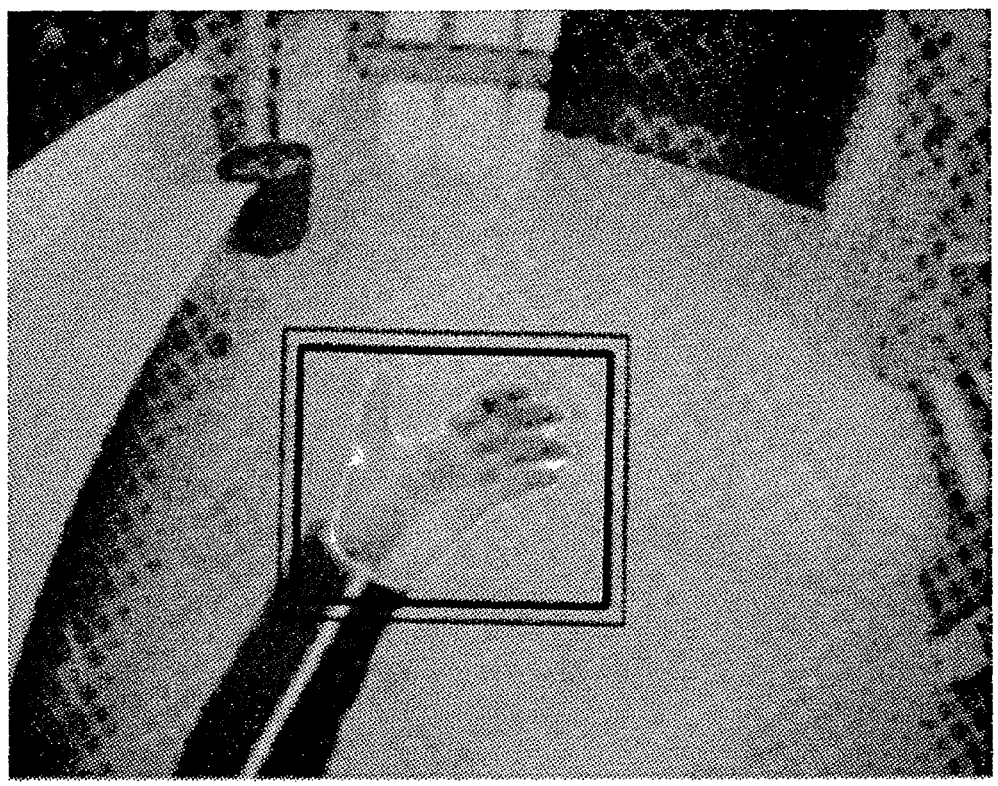
Figure 2L:
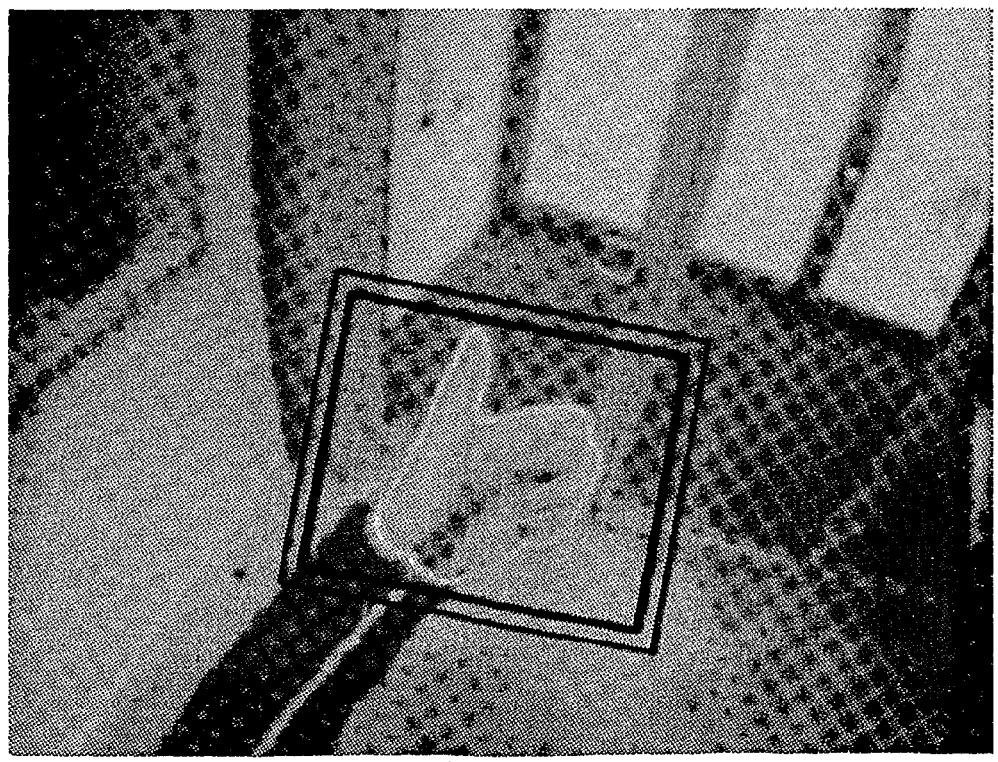

FIG. 1E shows a representation of an object showing: the contour C of the object, a set of foreground pixels $\Omega_f$, a set of background pixels $\Omega_b$, a foreground model $P(y|M_f)$ modelling the foreground, a background model $P(y|M_b)$ modelling the background and the warp W(x, p) (the location of the objects);

FIG. 1F is a graphical representation of our generative model representing the image as a bag-of-pixels.

We represent the object being tracked by its shape C, its location in the 2D image W(x, p) and two underlying appearance models: one for the foreground $P(y|M_f)$ and one for the background $P(y|M_b)$. FIG. 1E illustrates this with a simple example.

Shape: is represented by the zero level-set $C=\{x|\Phi(x)=0\}$ of an embedding function $\Phi(x)$ [1, 5]. The pixels $\Omega$ in the object frame are segmented into two regions: one for the foreground $\Omega_f$ and one for the background $\Omega_b$.

Location: is described by a warp W(x, p) that takes a pixel location x in the object frame and warps it into the image frame according to parameters p. This warp must form a group [14]; however, this is acceptable as many common useful transformations in computer vision do form groups, for instance: translation, translation+scale, similarity transforms, affine transforms and homographies.

Foreground and Background Appearance models: $P(y|M_f)$ and $P(y|M_b)$ are represented with YUV histograms using 32 bins per channel. The histograms are initialised either from a detection module or a user inputted initial bounding box. The pixels inside the bounding box are used to build the foreground model and the pixels from an inflated bounding box are used to build the background model. The two initial distributions are then used to produce a tentative segmentation, which is in turn used to rebuild the model. This procedure is iterated until the shape converges (similar to [15]). Once tracking commences the appearance models and shape C are estimated (adapted) online, as described in Sect. 6. In summary, we use the following notation:

x: A pixel location in the object coordinate frame.
y: A pixel value (in our experiments this is a YUV value).
I: Image.
W(x, p): Warp with parameters p.
$M=\{M_f, M_b\}$: Model parameter either foreground or background.
P(y|Mf): Foreground model over pixel values y.
P(y|Mb): Background model over pixel values y.
C: The contour that segments the foreground from background.
(x): Shape kernel (in our case the level-set embedding function).
$\Omega=\{\Omega_f, \Omega_b\}$: Pixels in the object frame [$\{x_0, y_0\}, \ldots, \{x_N, y_N\}$], which is partitioned into foreground pixels $\Omega_f$ and background pixels $\Omega_b$.
$H_E(z)$: Smoothed Heaviside step function.
$\delta_E(z)$: Smoothed Dirac delta function.

FIG. 1F illustrates the simple generative model we use to represent the image formation process. This model treats the image as a bag-of-pixels [6] and can, given the model M, the shape and the location p, be used to sample pixels $\{x, y\}$. Although the resultant image would not look like the true foreground/background image to a human (the pixels would be jumbled up), the colour distributions corresponding to the foreground/background regions $\Omega_f/\Omega_b$ would match the models $P(y|M_f)$ and $P(y|M_b)$. It is this simplicity that gives more invariance to viewpoint and allows 3D objects to be tracked robustly without having to model their specific 3D structure. The joint distribution for a single pixel given by the model in FIG. 1F is:

$$P(x, y, \Phi, p, M) = P(x|\Phi, p, M)P(y|M)P(M)P(\Phi)P(p). \quad (1)$$

We now divide (1) by $P(y) = \Sigma_M P(y|M)P(M)$ to give:

$$P(x, \Phi, p, M|y) = P(x|\Phi, p, M)P(M|y)P(\Phi)P(p), \quad (2)$$

where the term $P(M|y)$ is the pixel posterior, of the models M, given a pixel value y:

$$P(M_j | y) = \frac{P(y | M_j)P(M_j)}{\sum_{\{i=f,b\}} P(y | M_i)P(M_i)} \quad j = \{f, b\}. \quad (3)$$

Using this posterior is equivalent to applying Bayesian model selection to each individual pixel. We now marginalise over the models M, yielding the posterior probability of the shape $\Phi$ and the location p given a pixel $\{x, y\}$:

$$P(\Phi, p | x, y) = \frac{1}{P(x)} \sum_{\{i=f,b\}} \{P(x | \Phi, p, M_i)P(M_i | y)\} P(\Phi)P(p) \quad (4)$$

Note that the pixel posterior and marginalisation are the subtle but significant differences to the work in [4], which lacks the marginalisation step and uses a pixel-wise likelihood $P(y|M)$. We show in Sect. 7 that our formulation yields a much better behaved objective. We consider two possible methods for fusing the pixel posteriors: (i) a logarithmic opinion pool (LogOP):

$$P(\Phi, p | \Omega) = \prod_{i=1}^{N} \left\{ \sum_M \{P(x_i | \Phi, p, M)P(M | y_i)\} \right\} P(\Phi)P(p) \quad (5)$$

and (ii) a linear opinion pool (LinOP):

$$P(\Phi, p | \Omega) = \sum_{i=1}^{N} \left\{ \sum_M \{P(x_i | \Phi, p, M)P(M | y_i)\} \right\} P(\Phi)P(p). \quad (6)$$

The logarithmic opinion pool is normally the preferred choice and is most similar to previous work [4, 5]; whereas the linear opinion pool is equivalent to marginalising over the pixel locations—this is allowed as our bag-of-pixels generative model treats pixel locations as a random variable. We continue our derivation assuming a logarithmic opinion pool for clarity, but also include results using a linear opinion pool for completeness. Note the term $$\frac{1}{P(x)}$$

has been dropped as it is constant for all pixel locations and we only seek to maximise $P(\Phi, p|\Omega)$.

Section 3 Segmentation

The typical approach to region based segmentation methods is to take a product of the pixel-wise likelihood functions, over pixel locations xi, to get the overall likelihood $P(I|M)$. This can then be expressed as a summation by taking logs and optimised using variational level-sets [1, 5]. In contrast to these methods, our derivation leads to pixel posteriors and marginalisation (5), a subtle but important difference.

For the remainder of this section, in order to simplify our expressions (and without loss of generality), we assume that the registration is correct and therefore $x_i = W(x_i, p)$. We now specify the term $P(x_i|\Phi, p, M)$ in (5) and the term $P(M)$ in (3):

$$P(x_i | \Phi, p, M_f) = \frac{H_\epsilon(\Phi(x_i))}{\eta_f} \quad (7)$$

$$P(x_i | \Phi, p, M_b) = \frac{1 - H_\epsilon(\Phi(x_i))}{\eta_b}$$

$$P(M_f) = \frac{\eta_f}{\eta} \quad (8)$$

$$P(M_b) = \frac{\eta_b}{\eta},$$

where $$\eta = \eta_f + \eta_b, \quad (9)$$

$$\eta_f = \sum_{i=1}^{N} H_\epsilon(\Phi(x_i)),$$

$$\eta_b = \sum_{i=1}^{N} 1 - H_\epsilon(\Phi(x_i)).$$

Equation (7) represents normalised versions of the blurred Heaviside step functions used in typical region based level-set methods and can now be interpreted probabilistically as model specific spatial priors for a pixel location x. Equation (8) represents the model priors, which are given by the ratio of the area of the model specific region to the total area of both models. Equation (9) contains the normalisation constants (note that $\eta = N$).

We now specify a geometric prior on $\Phi$ that rewards a signed distance function:

$$P(\Phi) = \prod_{i=1}^{N} \frac{1}{\sigma\sqrt{2\pi}} \exp - \frac{(|\nabla \Phi(x_i)| - 1)^2}{2\sigma^2}, \quad (10)$$

where $\sigma$ specifies the relative weight of the prior. This gives a probabilistic interpretation to the work in [10]. Substituting (7), (8), (9) and (10) into (5) and taking logs, gives the following expression for the log posterior:

$$\log(P(\Phi, p | \Omega)) \propto \sum_{i=1}^{N} \left\{ \log(P(x_i | \Phi, p, y_i)) - \frac{(|\nabla \Phi(x_i)| - 1)^2}{2\sigma^2} \right\} + \quad (11)$$

$$N\log\left(\frac{1}{\sigma\sqrt{2\pi}}\right) + \log(P(p)),$$

where $$P(x_i \mid \Phi, p, y_i) = H_\epsilon(\Phi(x_i))P_f + (1 - H_\epsilon(\Phi(x_i)))P_b$$

and $$P_f = \frac{P(y_i \mid M_f)}{\eta_f P(y_i \mid M_f) + \eta_b P(y_i \mid M_b)}$$

$$P_b = \frac{P(y_i \mid M_b)}{\eta_f P(y_i \mid M_f) + \eta_b P(y_i \mid M_b)}.$$

Given that we are about to optimise w.r.t to $\Phi$ we can drop the last two terms in (11) and by calculus of variations [16] express the first variation (Gateaux derivative) of the functional as:

$$\frac{\partial P(\Phi, p \mid \Omega)}{\partial \Phi} = \frac{\delta_\epsilon(\Phi)(P_f - P_b)}{P(x \mid \Phi, p, y)} - \frac{1}{\sigma^2}\left[\nabla^2 \Phi - div\left(\frac{\nabla \Phi}{|\nabla \Phi|}\right)\right], \quad (12)$$

where $\nabla^2$ is the Laplacian operator and $\delta_\epsilon(\Phi)$ is the derivative of the blurred Heaviside step function, i.e. a blurred Dirac delta function. Interestingly, $\delta_\epsilon(\Phi)$ can now be interpreted as a way of expressing uncertainty on the contour C. If we were to use Gaussian uncertainty for the contour then the region based uncertainty would be expressed in terms of erf($\Phi$) instead of $H_E(\Phi)$. We seek $$\frac{\partial P(\Phi, p \| \Omega)}{\partial \Phi} = 0$$

by carrying out steepest-ascent using the following gradient flow:

$$\frac{\partial P(\Phi, p \mid \Omega)}{\partial t} = \frac{\partial P(\Phi, p \mid \Omega)}{\partial \Phi}. \quad (13)$$

In practice this is implemented using a simple numerical scheme on a discrete grid. All spatial derivatives are computed using central differences and the Laplacian uses a 3×3 spatial kernel. We use $\sigma = \sqrt{50}$ and a timestep T=1 for all experiments. For stability $$\frac{\tau}{\sigma^2} < 0.25$$

must be satisfied (see [10] for details).

Section 4 Tracking

It is possible to pose the tracking problem directly in a segmentation framework [8]. Instead, like [4] we model the frame-to-frame registration explicitly, by having the level-set in the object frame and introducing a warp W(x, p) into (11). The main benefits of this approach are: (i) control over the interaction between registration (tracking) and segmentation (local shape deformation); (ii) by registering the embedding function first, fewer iterations are required to take account of shape changes (In fact we find one per frame is adequate for our sequences. For other applications we may prefer two, or three, or perhaps more iterations.) We now drop any terms in (11) that are not a function of p in preparation for differentiation:

$$\log(P(\Phi, p \mid \Omega)) \propto \sum_{i=1}^{N} \{\log(P(x_i \mid \Phi, p, y_i))\} + \log(P(p)) + const. \quad (14)$$

Introducing a warp W(x$_i$, $\Delta$p) into (14) and dropping the prior term for brevity (we revisit this term in Sect. 5):

$$\log(P(\Phi, p \mid \Omega)) \propto \sum_{i=1}^{N} \{\log(P(W(x_i, \Delta p) \mid \Phi, p, y_i))\}, \quad (15)$$

where $\Delta$p represents an incremental warp of the shape kernel. There are many ways this expression could be optimised, the most similar work uses simple gradient ascent [4]. In contrast, we take advantage of the fact that all of the individual terms are probabilities, and therefore strictly positive. This allows us to write certain terms as squared square-roots and substitute in a first-order Taylor series approximation for each square-root, for example:

$$\left[\sqrt{H_\epsilon(\Phi(W(x_i, \Delta p)))}\right]^2 \approx \left[\sqrt{H_\epsilon(\Phi(x_i))} + \frac{1}{2\sqrt{H_\epsilon(\Phi(x_i))}} J\Delta p\right]^2, \quad (16)$$

where:

$$J = \frac{\partial H_\epsilon}{\partial \Phi} \frac{\partial \Phi}{\partial x} \frac{\partial W}{\partial \Delta p} = \delta_\epsilon(\Phi(x_i))\nabla\Phi(x_i)\frac{\partial W}{\partial \Delta p}.$$

Likewise we apply a similar expansion to $(1-H_\epsilon(\Phi(W(x_i, \Delta p)))$, allowing us then to optimise using Gauss-Newton. (The Taylor expansion is poorly conditioned if $H_E(\Phi(x_i))=0$; in practice this does not happen as the terms are never equal to zero). This has the advantage that the Hessian itself is not required, rather, a first-order approximation of the Hessian is used. In consequence it is fast, and in our experience exhibits rapid and reliable convergence in our problem domain. It also avoids the issues highlighted in [17] of choosing the appropriate step size for gradient ascent. Excluding the full details for brevity we arrive at an expression for $\Delta$p:

$$\Delta p = \left[\sum_{i=1}^{N} \frac{1}{2P(x_i \mid \Phi, p, y_i)}\left(\frac{P_f}{H(\Phi(x_i))} + \frac{P_b}{(1 - H(\Phi(x_i)))}\right)J^T J\right]^{-1} \times \quad (17)$$

$$\sum_{i=1}^{N} \frac{(P_f - P_b)J^T}{P(x_i \mid \Phi, p, y_i)}.$$

Equation (17) is then used to update the parameters p by composing W(x$_i$, p) with W(x$_i$, $\Delta$p)$^{-1}$, analogous to inverse compositional tracking [14].

Section 5 Drift Correction

Having the object represented by its location p and shape $\Phi$ leaves an ambiguity where it is possible to explain rigid transformations of the shape either with p or $\Phi$. Ideally, any rigid motion would be explained solely by p; however, over time the shape $\Phi$ slowly incorporates a rigid transformation. We define a prior on the location P(p) which makes small corrections to keep the left/right and top/bottom borders (the smallest distances between the contour and the corresponding side of the foreground box balanced and the minimum border distance equal to four pixels (in this example—but it could be fewer or more pixels). This is implemented using a proportional controller that takes the four border distances as its input and outputs the prior P(p).

Section 6 Online Learning

Once registration and segmentation are completed both the foreground and background models are adapted online in real time automatically. This is achieved using linear opinion pools with variable learning rates $\alpha_i$, i={f, b}:

$$P_t(y|M_i)=(1-\alpha_i)P_{t-1}(y|M_i)+\alpha_i P_t(y|M_i), i=\{f, b\}. \quad (18)$$

In all experiments $\alpha_f=0.02$ and $\alpha_b=0.025$. For shape adaptation we control the evolution rate of the level-set using the timestep T. Ideally these three parameters would change dynamically throughout the sequence to prevent learning occurring during times of confusion or if the object is lost; we intend to do this in future work.

Figure 5:
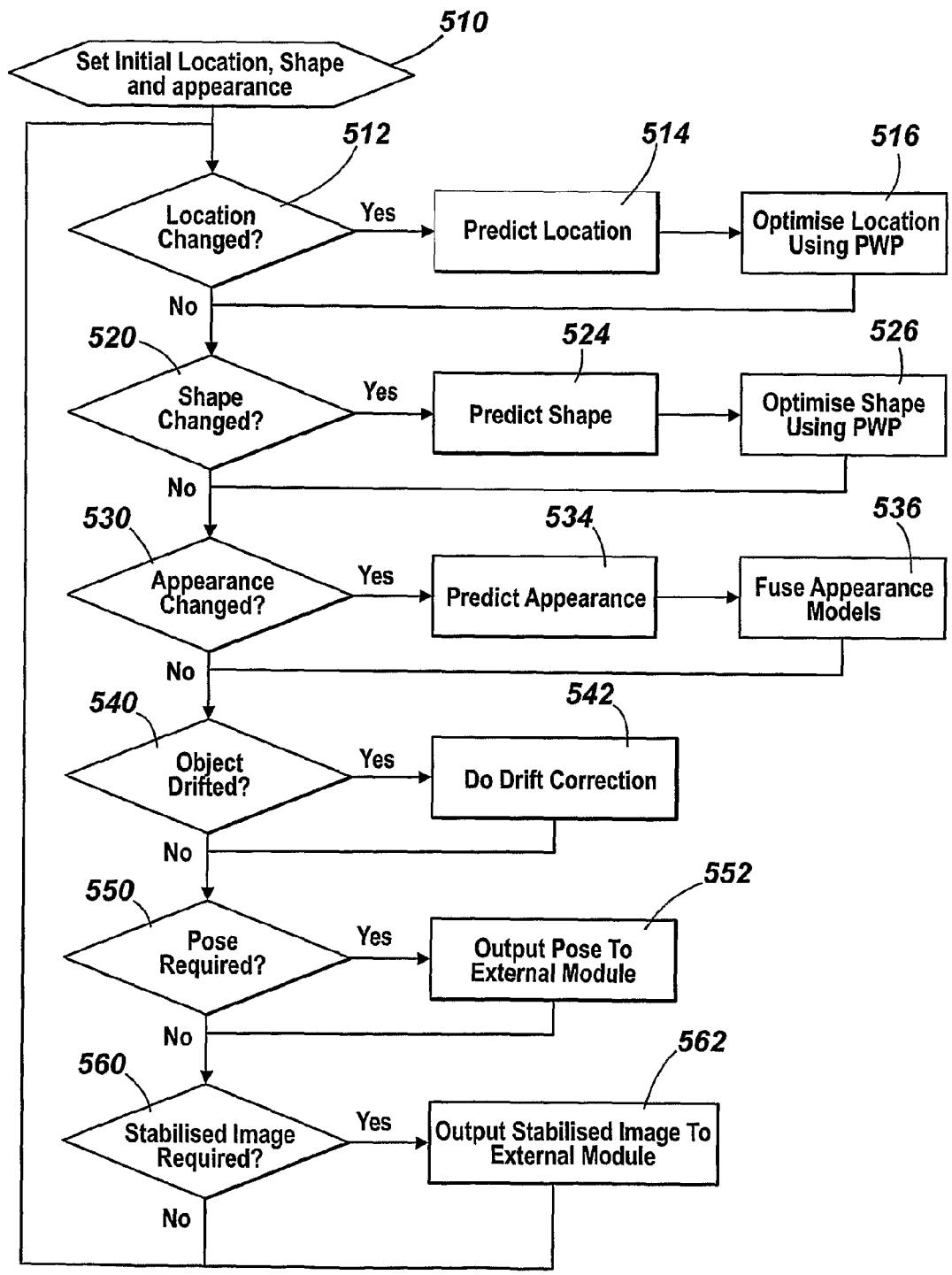
FIG. 5 shows another flow chart showing the method of a particular embodiment of the invention.

FIG. 5 shows a flow chart presenting one preferred method of tracking an object. An initial location, shape and appearance of an object, referenced 510, either exists from an earlier image from an image processing operation, or an initial location, shape and appearance is chosen. The system (not shown in FIG. 5) acquires data representative of another frame in a series of frames and determines, at step 512, whether the location of the object has changed. If not, the system processor goes to step 520. If so, the processor predicts the location of the object in the new image frame using past experience of movement of the object (step 514) and then optimises, at step 516 probabistically, the location of the object using pixel posterior probabilities, and marginalisation out of unwanted parameter, techniques (referred to as PWP). It then goes to step 520.

Step 520 is an assessment of whether the shape of the object has changed. If no, then the processor goes to step 530. If yes, then the processor predicts the new shape using an object shape model (step 524) and optimises the shape using PWP (step 526).

Step 530 is a determination of whether the appearance of the object has changed. If no, the processor goes to step 540. If yes, then the processor, using a probabistic appearance model, predicts the new appearance (step 534) and fuses the existing appearance model with the new predicted appearance model to create an updated appearance model, at step 536. This is then used in the next iteration of the tracking process. After step 536, the processor proceeds to perform step 540.

Step 540 is a determination of whether the object has drifted. If no, the processor goes to step 550. If yes, the processor performs step 542—drift correction, and then goes to step 550.

Step 550 is a determination of whether the object's pose is required to be output to an external module/to the outside world. If no, the processor goes to step 560. If yes, then step 552, outputting the pose to the outside world, is performed, and then the processor goes to step 560.

Step 560 is an evaluation of whether the image needs stabilising (this depends upon the application). If no, then the processor returns to step 512 and assesses whether the object has changed location in the next image frame acquired. If yes, then the processor performs step 562, which is to stabilise the image and output to an external module or device or output line, a stabilised image. The processor then returns to step 512 and assesses the next acquired image frame to determine whether the object location has changed in the newly acquired image.

This loop repeats for successive image frames that are to be image processed.

Section 7 Results

We have (internally and confidentially) tested our system extensively on live video, as well as on a variety of recorded sequences which include objects that exhibit rapid and agile motion with significant motion blur, varying lighting, moving cameras, and cluttered and changing backgrounds. FIGS. 2A to 2L show a qualitative evaluation of our method on three sequences. The first (shown in FIGS. 2A to 2D) is a speedboat undergoing a 180° out-of-plane rotation—note how the shape is adapted online. The second (shown in FIGS. 2E to 2H) is a person jumping around—note the motion blur and shape adaptation. Finally, the third (shown in FIGS. 2I to 2L) is a hand being tracked from a head mounted camera past a challenging background which has a similar appearance to the object.

Figure 3:
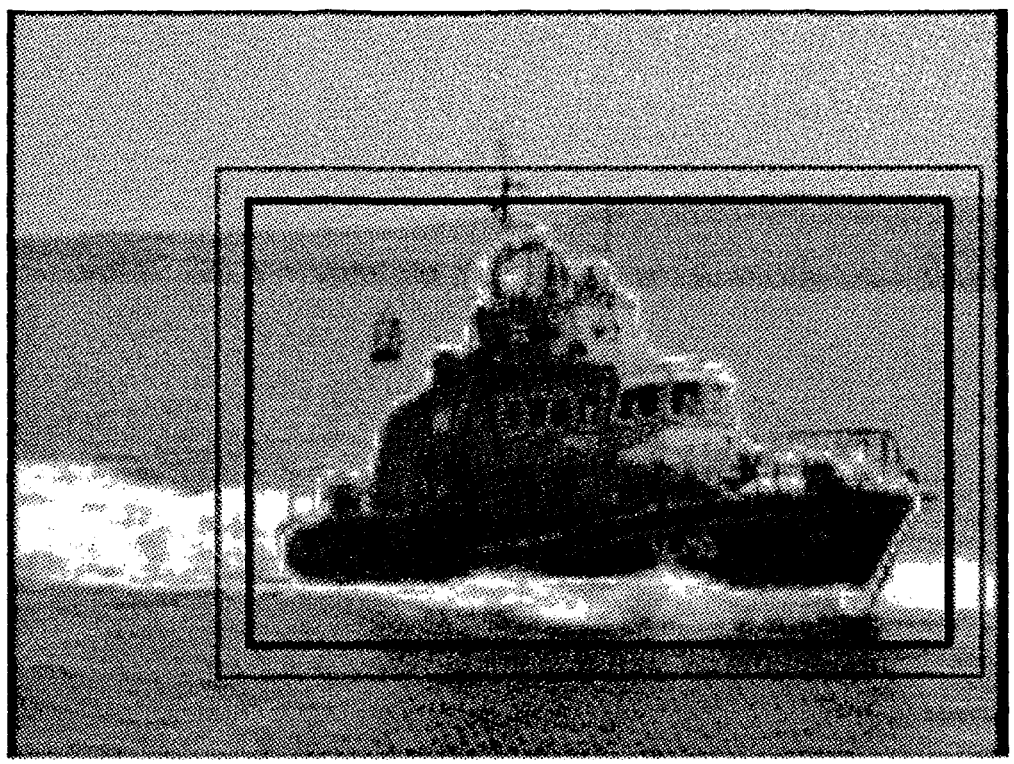
FIG. 3 shows a selection of video frames made using the invention.
Figure 3:
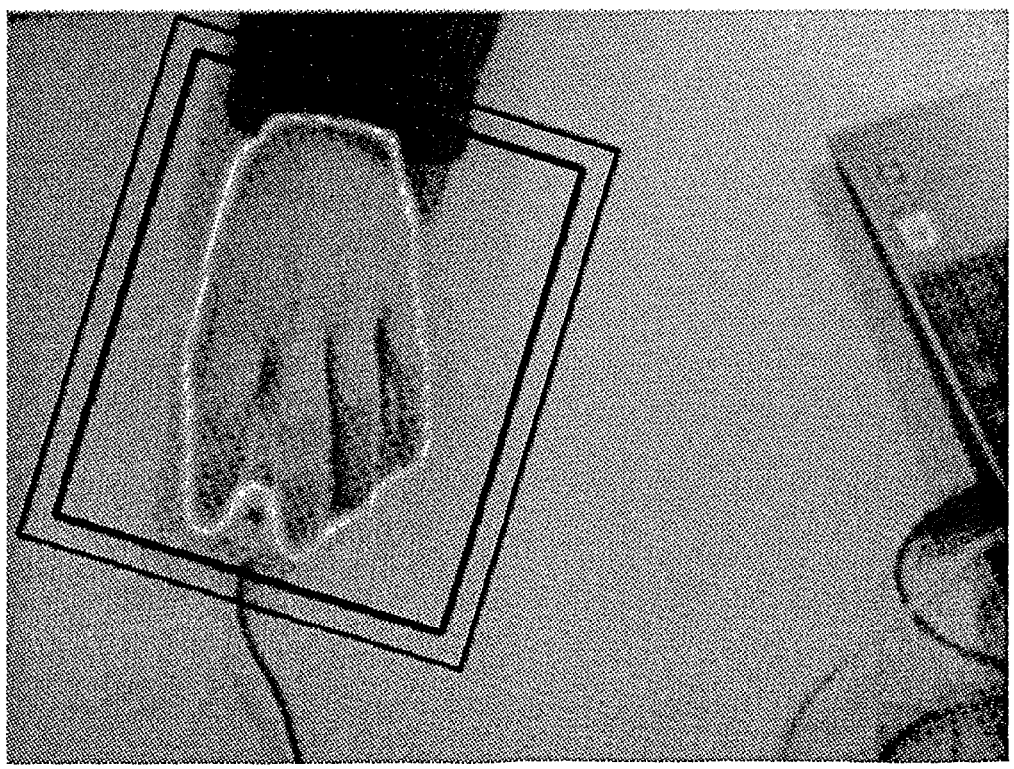
Figure 3:
Figure 3:
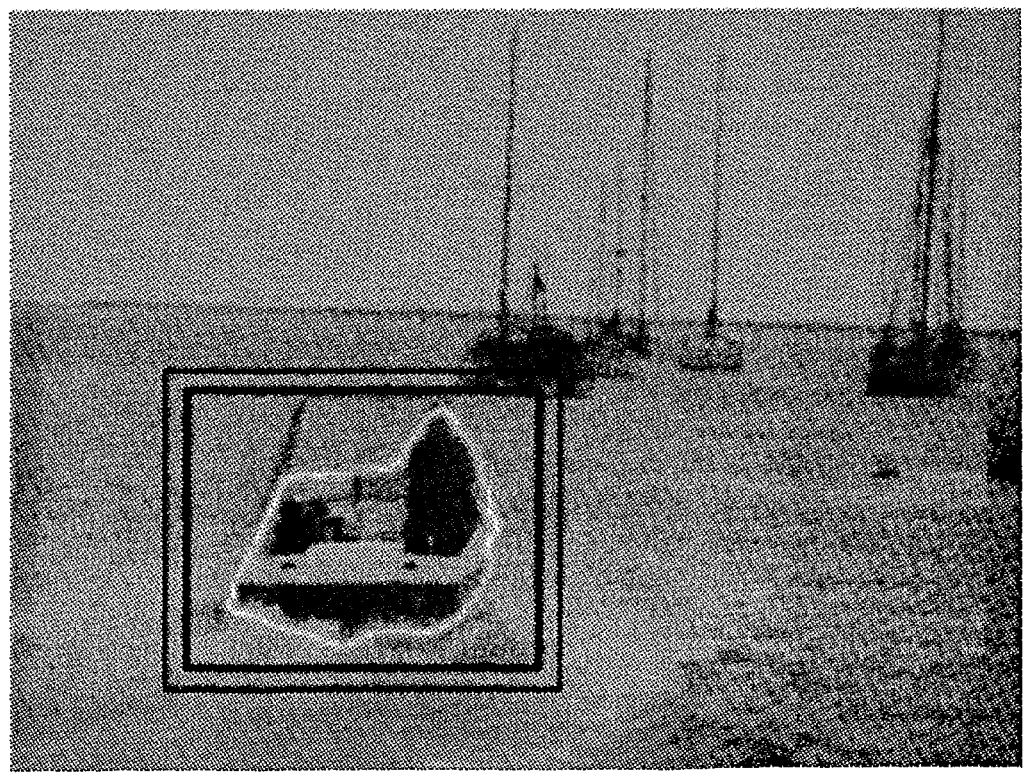
Figure 3:
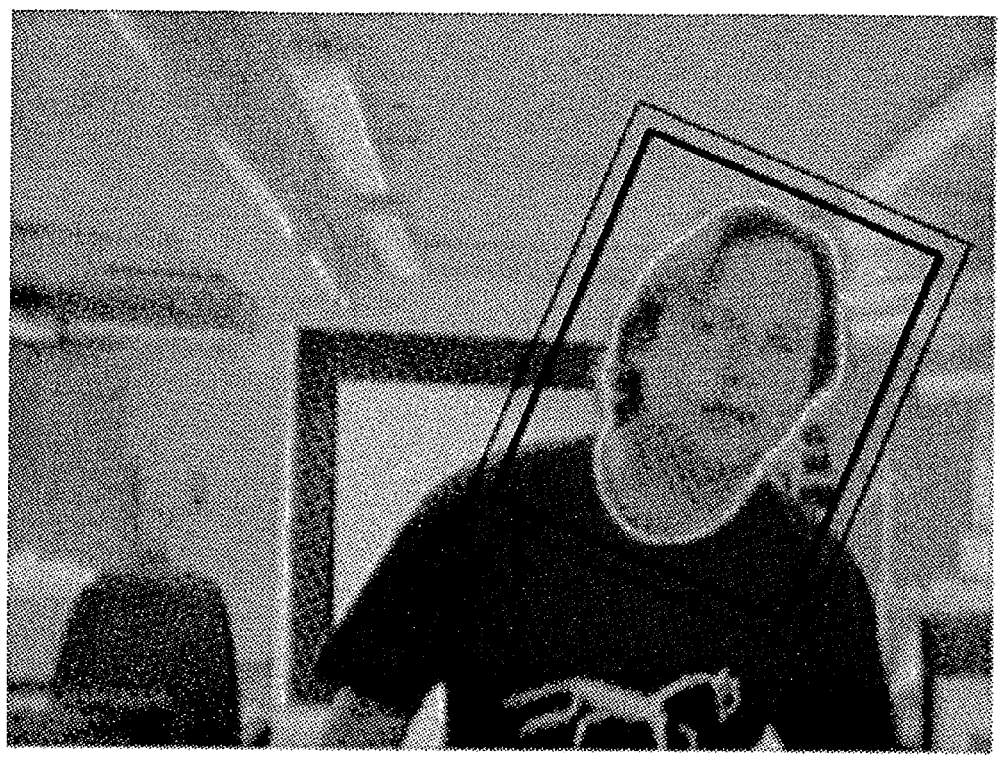
Figure 3:
Figure 3:
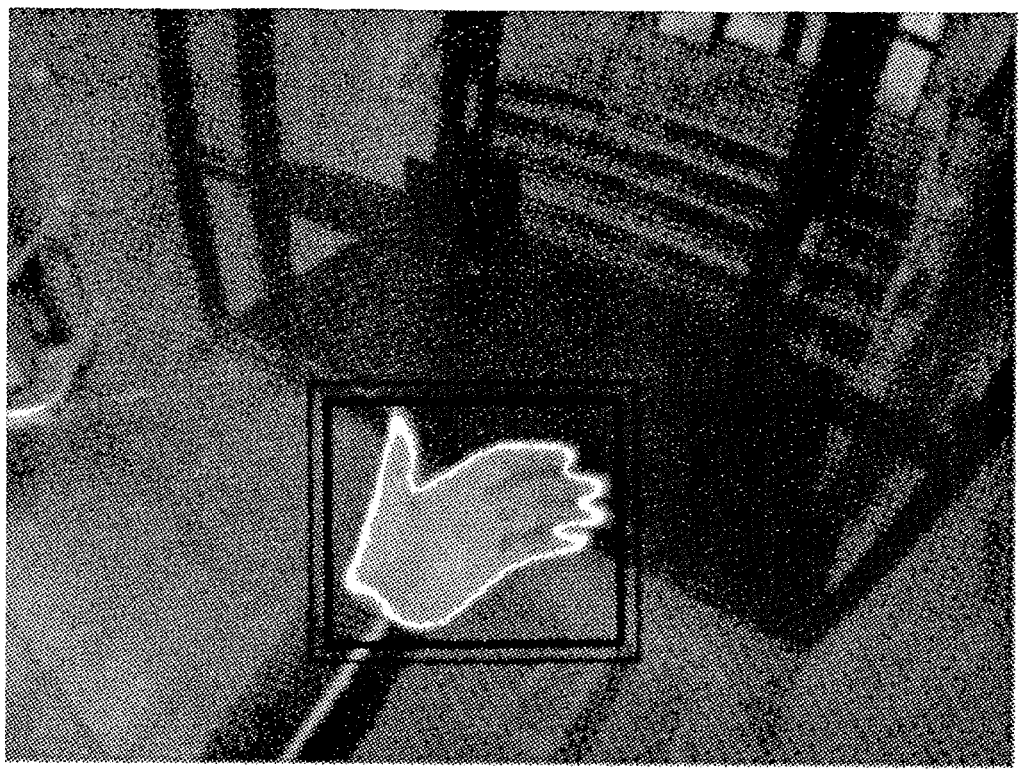
Figure 3:
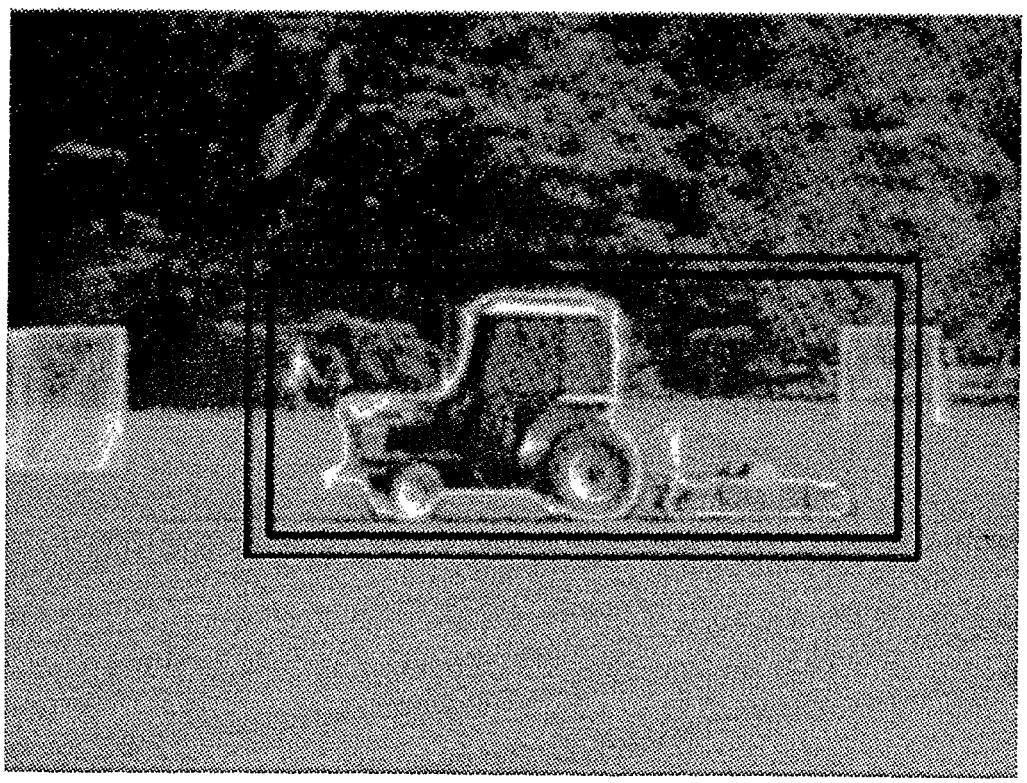
Figure 4A:
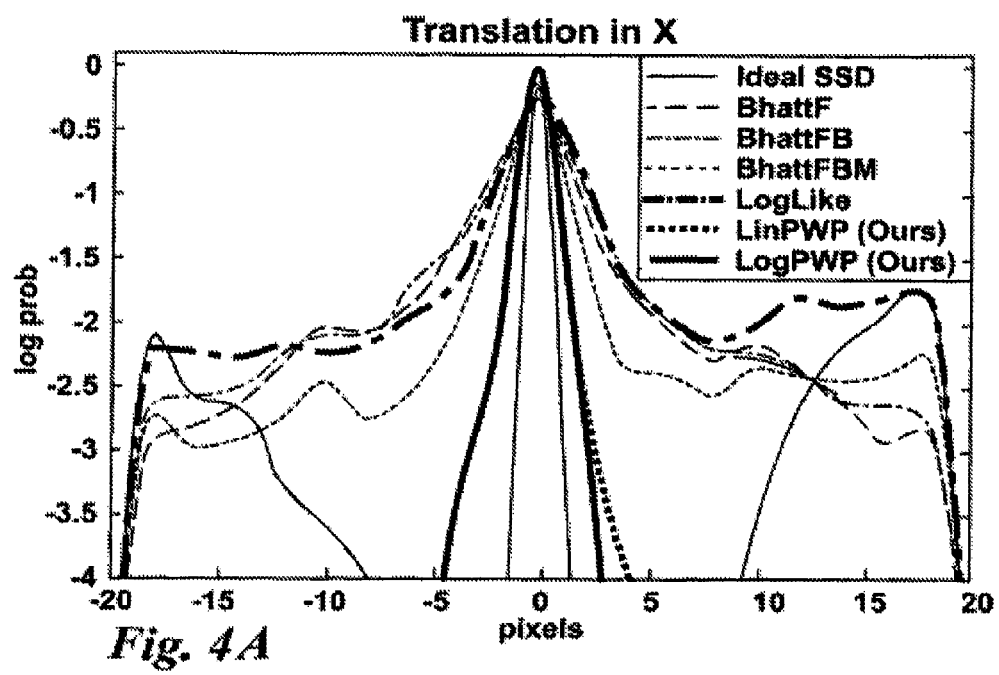
FIGS. 4A to 4D shows the log probability distribution of extrema in the cost functions generated from 20,000 frames of real video data for tracking a hand in an image.
Figure 4B:
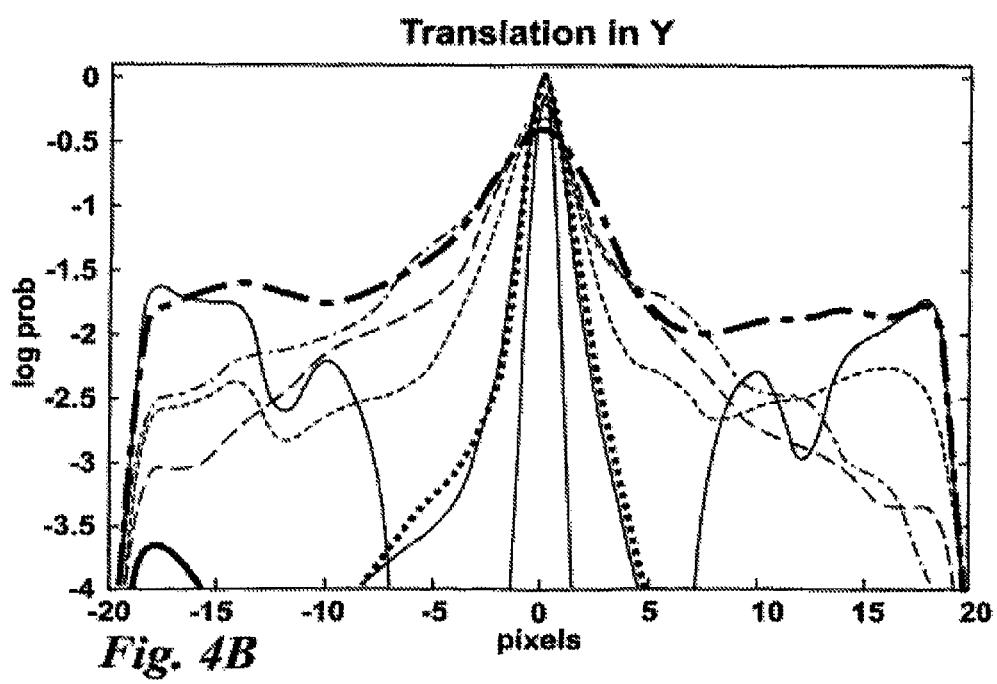
Figure 4C:
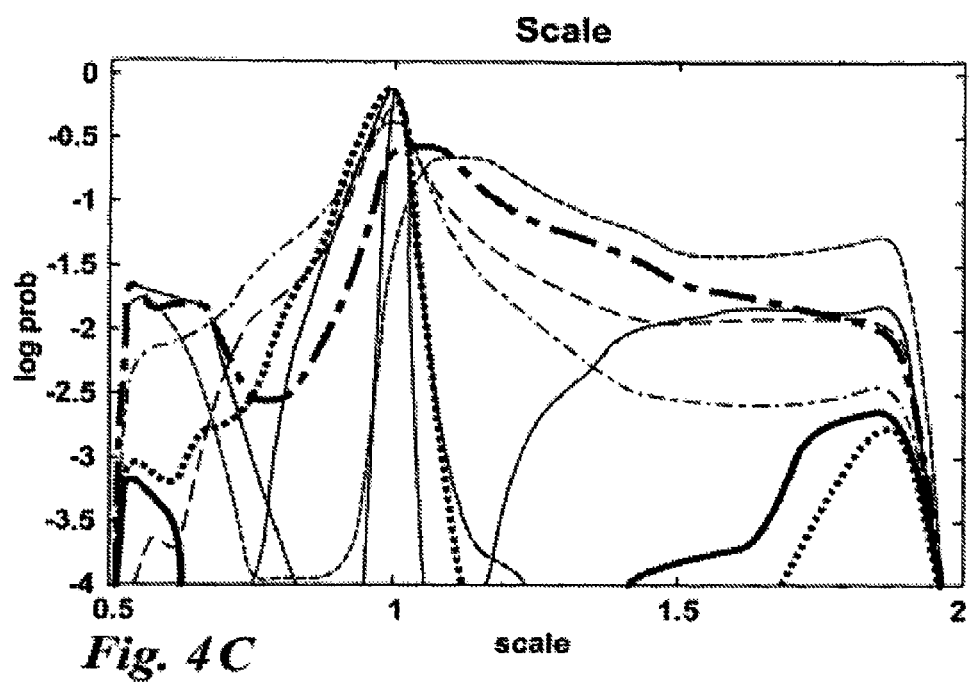
Figure 4D:
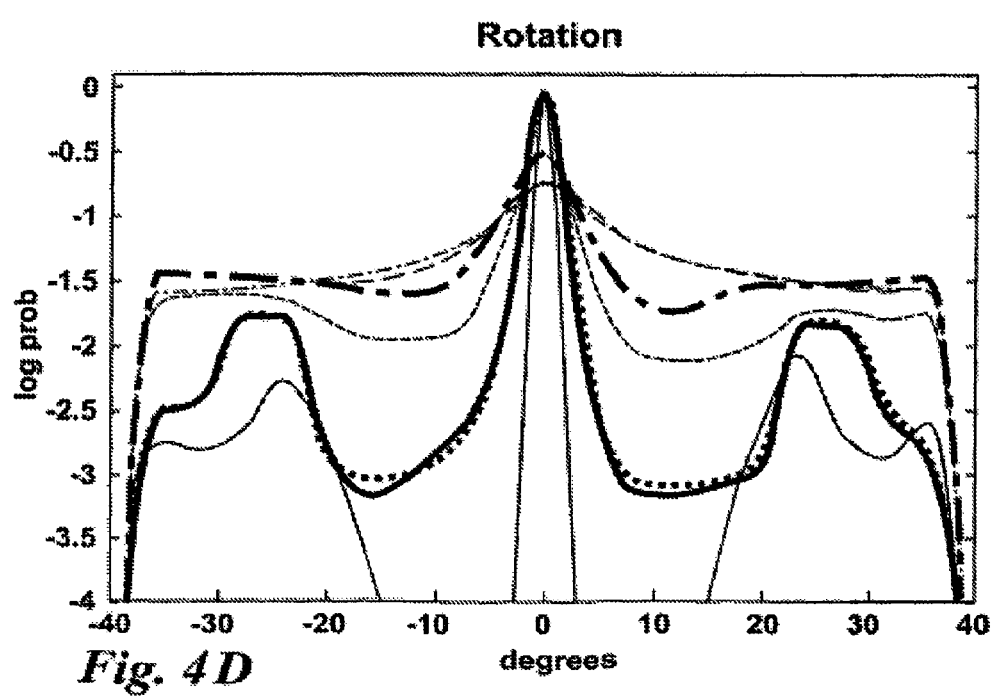

To perform a quantitative evaluation we have analysed the characteristics of the underlying cost function of our technique and compared this with competing alternatives, on a set of pre-recorded video sequences. FIG. 3 shows still images taken mid-sequence from a subset of these sequences; the minimum length is 400 frames and the total number of frames is over 20,000. To facilitate visualisation of the results we use a 2D rigid transformation+scale, considering each of the four dimensions separately. The competing cost functions considered correspond to the following alternative methods of tracking: level-set methods based on likelihoods [4, 2], mean-shift [12, 13, 11], inverse compositional [14] and distribution based tracking [8, 9].

A good cost function has a single extremum at the true location. A poor one has multiple extrema and any local optimisation technique is liable to fall into one of these, which in practice is often the start of tracking failure. For each video frame and each dimension (translation in x and y, rotation and scale) we have computed the objectives for the competing cost functions at 40 evenly spaced points over an interval centred at the true state. We have then extracted all local extrema from these objectives and examine how they are distributed across the interval. To summarise this information we computed a distribution for each dimension and each cost function, using our collection of over 20,000 frames. The ideal distribution would be a delta function centred on the true state; whereas a good distribution would be peaky around the true state and have low probability of local extrema within the region it will be required to converge from. A bad distribution would be relatively flat with high probability of local extrema over the entire space. The particular cost functions we consider are:

LogPWP: Pixel-wise posteriors fused using a logarithmic opinion pool.

LinPWP: Pixel-wise posteriors fused using a linear opinion pool.

LogLike: Log likelihood, used in most level-set work [5, 4, 2].

BhattF: Bhattacharyya coefficient:

$$B(\Omega_j) = \sum_{i=1}^{V} \sqrt{P(y_j|M_f)P(y_j|\Omega_f)},$$

used by [12, 13, 11].

BhattFB: Bhattacharyya coefficient with a background model:

$$B(\Omega_f, \Omega_b) = \sum_{j=1}^{V} \sqrt{P(y_j \mid M_f)p(y_j \mid \Omega_f)} + \sum_{j=1}^{V} \sqrt{P(y_j \mid M_b)P(y_j \mid \Omega_b)},$$

BhattFBM: Bhattacharyya coefficient with a background mismatch:

$$B(\Omega_f, \Omega_b) = \sum_{j=1}^{V} \sqrt{P(y_j \mid M_f)p(y \mid \Omega_f)} - \sum_{j=1}^{V} \sqrt{P(y_j \mid M_f)P(y_j \mid \Omega_b)},$$

suggested by [9].

Ideal SSD: Sum of squared pixel differences using the ideal template i.e. the template extracted at the current location p. This is essentially what you would get if you had the perfect generative model giving the true pixel value at each pixel location including the noise. This of course is never going to be achievable but has been included as a useful benchmark and gives an indication of what effect incorporating texture may have.

Note: V is the number of pixel values i.e. 32×32×32; $P(y|\Omega_i)$ i={f, b} is the empirical density built from the pixels $\Omega_i$ and when computing Bhattacharyya coefficients we weight the contribution of each pixel according to our shape kernel, which is identical to Yilmaz's work [11].

FIG. 4 shows distributions generated from over 20,000 real video frames for: translation in x, translation in y, scale and rotation.

Translation in x and y: Our method has narrower distributions near the true state than all methods apart from ideal SSD and is significantly better than the log likelihood used by [4]. Unlike the other methods it also exhibits virtually no extrema outside a ±5 pixel region—this means that our methods will converge to within ±5 pixels of the true state from anywhere within the ±20 pixel space we have evaluated.

Scale: The Bhattacharyya method and Bhattacharyya with background mismatch both have poor localisation in scale, which is in agreement with the findings of many authors. The log likelihood also poorly localises scale compared with our posterior based methods.

Rotation: All Bhattacharyya methods and the log likelihood are poor at correctly localising the rotation. The straight Bhattacharyya coefficient for example has more than a 1% chance of exhibiting extrema anywhere in the rotation space, at a 30 Hz frame rate this corresponds to approximately 1 frame in every 3 seconds of video. It is worth noting that the side lobes (at approximately 25°) exhibited by our methods and ideal SSD are due to the self similarity corresponding to fingers in the hand sequences.

Some other people, for example [4, 5, 2], use a single Gaussian parametric model. This implicitly enforces a smooth, unimodal distribution for the joint likelihood. Non-parametric representations, such as we choose to have in this embodiment, do not exhibit these properties; however, they are better at describing complicated distributions and are therefore desirable. The reason that our method can deal with these distributions is because of the normalising denominator in (3) and the marginalisation step in (4). These two steps prevent individual pixels from dominating the cost function hence making it smoother and well-behaved.

The work of [8] and its subsequent improvement [9] use distribution matching techniques to incorporate non-parametric distributions into a level-set framework. These methods, similar to the Bhattacharyya based methods, involve computing the empirical densities at every iteration of the optimisation, whereas our method avoids this extra cost. Not only is our method superior to these approaches in terms of cost functions (see FIG. 4), but it is computationally faster/cheaper to evaluate as it does not require empirical distributions. This is a significant benefit because it not only reduces the computational cost per iteration, but avoids the issue of having to build 'good' distributions. One explanation for difference between the performance of these methods and ours, is that it is hard to build 'good' empirical distributions in real-time and most methods rely on simple histograms.

Section 7.1 Timing

All terms in (17) include ($\Phi(x_i)$) (blurred Dirac delta function). This means that an individual pixel's contribution to the optimisation diminishes the further from the contour it is. An efficient implementation, therefore, recognises this. Our implementation ignores pixels outside a narrow band and for an object size of 180×180 pixels runs in 500 s on a P4 3.6 GHz machine. On average the system runs at a frame rate of 85 Hz for the complete algorithm and if shape and appearance learning are turned off (i.e. rigid registration only) it averages 230 Hz.

When we refer to our method and systems operating in real-time we mean that the image processing takes place fast enough to be done between frames.

Advantages:

As disclosed earlier, at least some embodiments of the invention requires minimal prior knowledge about target shape/appearance, but some additional information (such as shape or appearance constraints) could be incorporated, within the same framework, if available; this is in contrast to model-based trackers which in some circumstances satisfy (ii)-(v) below, but require strong geometric knowledge about the target.

Tracking is robust because it can handle large inter-frame displacement; this is in contrast to most template or correlation-based trackers; the most robust tracking would be achieved by repeated detection, but this presently requires either a very strong appearance model or is hugely computationally expensive, or both.

The tracker separates the n-D rigid (or projective) motion of the target from local deformations in shape; it can therefore be used to localise (i.e. solve for the rigid degrees of freedom of target location) targets whose appearance changes over time; e.g. a pulsating heart (either 2D images or 3D images), spreading fingers, or a target which undergoes 3D rigid motion and whose 2D projection is therefore pose dependent. Most work based on similar theory does not solve for the rigid pose parameters separately and consequently can be prone to the shape drifting over time.

The tracker is capable of localising multiple targets at once, correctly resolving occlusions and relative depth ordering of targets within the same frame.

Supported in some embodiments by real-time implementation (C++) and so can be used for visual servoing or control of robotic (e.g. pan tilt) devices, or any other application where immediate results are required. Various real-time tracking methods exist but none currently satisfies (i)-(iv) above.

The tracker optimises a joint probability based on the posterior probabilities that pixels are either background or foreground. This is in contrast to other methods which consider the likelihood of a pixel value under either the background or foreground model. This enables it to work with non-parametric distributions better than prior art.

The tracker in many embodiments treats the pixel location and model parameters as "nuisance" variables and marginalises them out. This results in a sum over the posterior, in contrast to all other similar methods which assume pixel independence and take a product over pixel value likelihoods.

In the context of visual tracking, to our knowledge the tracker is the first to use the idea of constraining the embedding function directly (rather than as a separate step) to be a signed distance function and the tracker is the first to give a probabilistic interpretation on this constraint.

The tracker provides, in many embodiments, a novel way to keep the target from drifting away from the centre its own coordinate frame, using closed-loop feedback.

Overview

We have developed a new probabilistic framework for robust, real-time, visual tracking of previously unseen objects from a moving camera. The key contribution of our method and reason for its superior performance compared with others is the use of pixel posteriors as opposed to a product over pixel-wise likelihoods. This allows us to marginalise out unwanted parameters over the foreground and/or background models. The pixel posteriors give us relative weights in the "averaging" process that is marginalisation. Other people do not marginalise over the model parameter M (is a pixel background or foreground). In contrast to other methods [4, 5], we solve the registration using Gauss Newton, which has significant practical benefits, namely: (i) the difficulty associated with step size selection is removed and (ii) reliable and fast convergence. We have demonstrated the benefits of our method both qualitatively and quantitatively with a thorough analysis of pixel posteriors versus competing alternatives using over 20,000 video frames. Our results demonstrate that using pixel posteriors provides excellent performance when incorporating non-parametric distributions into region based level-sets. It not only offers superior cost functions but avoids the need for computing empirical distributions [12, 8, 9, 11] and is therefore faster.

The tracker in the examples given, works by seeking maximal separation between background and foreground in an n-dimensional image where the boundary between these is defined by the zero level-set of an n+1 degree of freedom embedding function. This separation is resolved into two parts: a rigid transformation of the target from its own coordinate frame to the image frame, and a local shape deformation (if necessary). Further, the embedding function is automatically adjusted to be a signed-distance function. Further, the shape and/or pose parameters are adjusted via closed-loop feedback automatically to prevent drift of the target away from the origin of the target coordinate frame. The background and foreground are represented by probability distributions (e.g. non-parametric distributions such as colour histograms, or parametric distributions such as a mixture of Gaussians) which are adapted on-line over time. The objective function which is maximised is derived probabilistically and sums probabilities (which include terms representing the posterior probability that a pixel is either foreground or background) over all pixels in the foreground and neighbouring background. This is in contrast to the most similar methods which take the likelihood rather than the posterior, and take the product over all pixels. When there are multiple targets, the method computes the posterior probability distribution over possible depth orderings.

Visual tracking of objects has numerous applications in surveillance (either aviation, terrestrial or maritime), tracking for military purposes (e.g. targets), tracking of organs in medical imaging applications: target localisation, as in this invention, can be used to drive pan-tilt-zoom devices to stabilise a target, or for visual servoing such as moving a robot to follow a target, or for docking, alignment or pointing of devices etc.

Other Comments

Returning to the point about using colour histograms of the object region and the background region of captured images (or at least colour histograms), we note that U.S. Pat. No. 6,590,999 Comaniciu's, invention uses the same representation. He then tries to maximise the place in the image where the maximum is reached to be the new target location. So while his target representation is similar to ours, his method for locating the target is different, both in terms of the objective function he maximises, and the way he does the maximisation.

In contrast, Cremers (see ref 4) has a very similar framework to us. He represents a contour as a level-set, seeks the best alignment of contour to the image, and then allows a shape deformation. He does three things differently to us (i) he uses pixel-wise likelihoods as opposed to our pixel posteriors; (ii) he does not marginalise over the model parameters; (iii) his representation is usually a single colour distribution (i.e. a Gaussian pdf centred on the dominant colour/grey-level).

It will be appreciated that whilst in our described methods the initial boundary delineating target object from background has a circular shape, this is only to start the process using a minimal amount of information. Once the boundary contour has converged to a particular shape (background/foreground segmentation) it is then this shape which is propagated to the next frame, on the assumption that radical changes of shape will not take place quickly.

The information that is required to enable the method to work in the detailed embodiment described is the estimate of the colour histogram of the foreground object, and an estimate of the colour histogram of background area. We use a minimal amount of information as requisites of the image processing method to operate properly. An initial elliptical boundary as a starting shape for the boundary also determines the object reference frame: the x and y axes are aligned with the ellipse's, and the rotation given by the angle between the image x-axis and the ellipse x-axis. The initial scale is taken (arbitrarily) to be 1, in our examples.

Note that in general one could replace "colour histogram" with "appearance model" as a more general statement. For example we could use a single colour model, perhaps with a Gaussian pdf centred on this single colour, or instead we could use, for instance a local measure of texture such as the frequency spectrum of image data. The initial boundary ellipse provides a region which the user hopes contains mainly foreground pixels. The region outside this (actually outside a buffer zone around the ellipse) is taken to be background. The level-set segmentation algorithm is then iterated a few times to locate the boundary, and the colour histograms are updated on the basis of what is now considered foreground/background.

As an alternative to the ellipse initialisation, we can apply a face detector and take the interior of the region located by the detector as the foreground and build a colour model from this data, and take a region outside the face to be representative of the background, and build a background colour model from the pixel data in this region. We have an implementation that supports this method of initialisation as well.

A third alternative would be to perform automatic object recognition, and to initialise the appearance models using the region identified by the object recognition module (e.g. a boat or pedestrian detector), and a region outside the object.

A fourth alternative would be to get the user to indicate using user-input (e.g. mouse strokes), parts of the foreground and background. This method is popular in segmentation methods that appear in products like photoshop.

When we delineate the object/background boundary by maximisation of equation (5) or (6), or more specifically the maximisation of equation (11) for shape and equation (15) for pose, is formulated over all pixels in the image. However the contribution of pixels which are distant from the boundary is negligibly small. We therefore only consider pixels in a narrow band around the current contour, since these are the ones which have a significant effect on the pose/shape at each iteration. Because of this, the speed of the method scales with the length of the contour, not with the size of the image. This method is called the narrow band method. It is well known in the level-set literature (i.e. on its own, it is not a novel part of our invention). A good, brief introduction to narrow-band methods and also to level-sets in general can be found at the site http://math.berkeley.edu/~sethian/2006/Semiconductors/ieee_level_set_explain.html.

We can handle multiple objects in a number of ways. In one scenario, all the objects undergo the same motion (i.e. their motion can be described by a single common transformation, such as if we are tracking a number of planar blobs fixed on a planar surface, viewed from a moving camera). In this instance the bounding contour is simply more complicated than a simple closed curve. This is a major benefit of using the level-set formulation, in that there are few restrictions on the topology of the bounding contour. Alternatively, we could instantiate multiple trackers all of which operate independently. This works well if the objects never occlude one another.

It will be appreciated that during the marginalisation step, when we evaluate posterior probabilities for each pixel, we have a probability that the pixel is foreground and a probability that the same pixel is background. These sum to one (P(foreground|y) and P(background|y), where y is the pixel value, summed equals one).

Although we talk about images, and although in many examples the images being processed will be 2-D images, they could be n-D images. For example MRI or CT scanned are referred to as "images" even though they cover three spatial dimensions rather than two (usually, but not always, comprised of multiple parallel slices, each of which is a 2-D image).

One non-parametric distribution for image values discussed so far is the colour histogram where each "bin" in the histogram represents the relative probability for a particular colour appearing in an object (and also one of the probability of the colour appearing in the background). It is a numerical, or non-parametric, way of representing the probabilities. An alternative parametric representation could use a function of certain parameters to represent the probability distribution. For example if the colour of the foreground were "c" then a Gaussian distribution (i.e. Bell curve)

$$P(y \mid c) \propto \exp - \frac{(y-c)^2}{2\sigma^2}$$

would capture an appearance model that has all of the colour at or around "c", with the spread around "c" controlled by the parameter sigma. Parametric distributions, especially Gaussians, often lead to nice objective functions, but at the cost of reduced representational power. A single Gaussian cannot adequately represent the appearance of an object that is half red and half blue.

It will be appreciated that the foreground/background membership of any given pixel cannot be ascertained with certainty. The process of marginalisation over M, the membership of a pixel, to obtain a distribution in p (the pose) and Φ (shape) only, computes a weighted average of the conditional distributions P(Φ, p|M, I) with the weights given by P(M). Marginalisation thus "averages out" the uncertainty in M.

An analogy would be determining the probability distribution of an individual's life-span. Life-span is affected by lifestyle choices so that the lifespan distribution given certain lifestyle choices can be very different. For example P(lifespan|lifestylechoice=smoker) is very different from P(lifespan|lifestylechoice=non-smoker).

In the absence of firm knowledge about lifestyle choices, P(lifespan) (the unconditional or marginal distribution) gives the "average" distribution. It is obtained by a weighted average of the conditional distributions, with the weights given by the relative probabilities of each lifestyle choice in the population at large:

$P$(lifespan)=sum over lifestyle choices of
   $P$(lifespan|lifestyle choice) times $P$(lifestyle
   choice).

We have referred to a "bag-of-pixels" model. There follows a discussion of that approach.

It will be appreciated that, in the context of marginalising out of the models one or more nuisance parameters, each of the mathematical symbols is a parameter: shape, pose, pixel-location (position in image), pixel-value (e.g. rgb colour), and also of course the model-selection parameter (foreground/background). It just happens that we are interested in the shape and pose but not the model-selection parameters, hence they are a nuisance. It is for this reason that we average/marginalise them out—as we do not really want to have to worry about them.

It could be that a different problem would have different nuisance parameters. Say for instance we wanted to track an object and we know that it is either stationary or moving (depending on which is true influences the way we predict where the object is in the next frame). In that example, we do not actually care whether it is stationary or moving: we only want to know where it is in each frame, and so we could equally marginalise/average out the parameter that says whether it is moving or stationary.

More generally, in any estimation problem, our goal is to infer the best values for certain parameters, given measurements related to those parameters. In a very simple case, we might measure the unknown parameter directly. But in most cases, what we will measure is related to the desired parameters indirectly through some mathematical function which models the relationship between measurement and parameter value. Further, it is often the case that the obvious functional relationship contains some other unknown parameters as well. If we knew the values of these "nuisance" or "latent" or "hidden" parameters, the estimation problem would be easier, but in general we do not. One approach is to estimate the nuisance or latent parameters from the measurements, and then use these estimates to work out the parameter values we desire. But this requires committing to particular values for the latent variables. If instead we have the relative probabilities associated with each possible value of the latent/hidden/ nuisance variables, we can marginalise the latent variables out by taking a weighted average (with the weights given by the relative probabilities).

In our example given earlier, with reference to the drawings, the parameters we really want are the pose p and the shape Phi. The segmentation parameter M, which indicates if a pixel is foreground or background is in this case a nuisance parameter. We estimate the probabilities P(M y) for each pixel and use these probabilities to marginalise out M, the pixel-wise segmentation parameter, yielding P(Phi, p x, y). The equation for P(Phi, p x, y) captures the relationship, for each pixel, of the probability of a particular shape/pose, given a particular pixel and its colour.

A standard approach to many computer vision problems is to devise a model of the image formation process in a given scenario, and then to try to maximise the probability of one or more parameters of the model, given a particular image. For example, suppose we decide that the image formation process consists of "pasting" a foreground object of known size, shape, appearance and orientation, into a known background the image at an unknown position. This then is a simple generative model (though not a very powerful one because it can only model one specific foreground object against a specific background). The set of all possible images under this model can in theory be generated by considering all possible parameter values (where the parameters are the x-y locations of where the foreground object has been pasted). The probability of any given image has been generated by this model can be evaluated for any (for every) parameter value, and the aim is to find the parameter (e.g. position of foreground object in image) which maximises this probability.

Different choices of generative model will lead to different objective functions, some of which may be easier or harder—or perhaps even intractable—to optimise. Different choices of generative model will also lead to more or less representational power. A good method results if the generative model is general enough to capture a wide variation in possible input conditions, but still leads to an objective function which is "well behaved" and tractable to optimise.

The bag-of-pixels model of the image formation process is different: it says that we choose at random background (bg) or foreground (fg) as our model M, and choose a colour y at random from the relevant bg or fg histogram. We then choose (according to bg or fg and the current shape but otherwise at random) a pixel in the image and colour this pixel with the value y. This model will give a high probability for the correct parameters (pose and shape) if there is decent figure/ground separation. It will also give the same high probability to an image in which all the pixels in the foreground are jumbled up, and all the pixels in the background are jumbled up—but we don't really care about this. What we care about is that the bag-of-pixels model (i) has enough representational power to allow good figure/ground segmentation; (ii) confers a high degree of invariance to intra-object appearance changes such as local deformations (e.g. changes in facial expression don't affect the contour, but do affect the internal appearance model—the bag of pixels model is pretty-mcu invariant to changes in facial expression) and (iii) leads to a clean, tractable objective function.

It will be appreciated that for some embodiments we can replace "pixel" in the claims with "pixel unit", where a "pixel unit" is a group of two or more actual pixels in the image, and the techniques can be applied to the pixel units as if they were pixels. For example, if the image has its pixels grouped in pixel units, they might as well be pixels so far as the image processing techniques are concerned.

What is claimed is:

1. A method of tracking objects in a series of n-D images that have objects appearing in a background comprising using a probabilistic model of the appearance of the objects and of the appearance of the background in the images, and using an evaluation of whether particular pixels in the images are a part of an object or a part of the background, that evaluation comprising determining the posterior model probabilities that a particular pixel or group of pixels belongs to an object or to the background, and further comprising marginalising over these object/background membership probabilities to yield a function of the pose parameters of the objects, where at least the object/background membership is adjudged to be a nuisance parameter and marginalised out;

wherein a processor is configured to perform an evaluation of equation (3) followed by an evaluation of equation (4), wherein:

$$P(M_j \mid y) = \frac{P(y \mid M_j)P(M_j)}{\sum_{\{i=f,b\}} P(y \mid M_i)P(M_i)} \quad j = \{f, b\}$$

Equation (3) is $$P(\Phi, p \mid x, y) = \frac{1}{P(x)} \sum_{\{i=f,b\}} \{P(x \mid \Phi, p, M_i)P(M_i \mid y)\} P(\Phi)P(p)$$

and Equation (4) is and i can be either foreground f or background b;

$P(M_i)$ is the prior probability of the model $M_i$;

$P(y|M_i)$ is the likelihood of seeing the pixel value y given the model $M_i$;

$P(M_i|y)$ is the posterior of the model $M_i$ given the pixel value y;

$P(x|\Phi, p, M_i)$ is the likelihood of the pixel location x given the shape $\Phi$, the pose p and the model $M_i$;

$P(\Phi)$ is prior probability of the shape $\Phi$;

$P(p)$ is the prior probability of the pose p;

$P(x)$ is the probability of pixel location x;

$P(\Phi, p|x, y)$ is the posterior probability of the shape $\Phi$ and the pose p given the pixel location x and the pixel value y.

2. A method of segmenting objects in a series of n-D images that have objects appearing in a background comprising using a probabilistic model of the appearance of the objects and of the appearance of the background in the images, and using an evaluation of whether particular pixels in the images are a part of an object or a part of the background, that evaluation comprising determining the posterior model probabilities that a particular pixel or group of pixels belongs to an object or to the background, and further comprising marginalising over these object/background membership probabilities to yield a function of the shape of the objects, where at least the object/background membership is adjudged to be a nuisance parameter and marginalised out;

wherein a processor is configured to perform an evaluation of equation (3) followed by an evaluation of equation (4), wherein:

Equation (3) is:

$$P(M_j \mid y) = \frac{P(y \mid M_j)P(M_j)}{\sum_{\{i=f,b\}} P(y \mid M_j)P(M_j)} \quad j = \{f, b\}$$

and Equation (4) is:

$$P(\Phi, p \mid x, y) = \frac{1}{P(x)} \sum_{\{i=f,b\}} \{P(x \mid \Phi, p, M_i)P(M_i \mid y)\}P(\Phi)P(p)$$

and
i can be either foreground f or background b;
P($M_i$) is the prior probability of the model $M_i$;
P(y|$M_i$) is the likelihood of seeing the pixel value y given the model
P($M_i$|y) is the posterior of the model $M_i$ given the pixel value y;
P(x|$\Phi$, p, $M_i$) is the likelihood of the pixel location x given the shape $\Phi$, the pose p and the model $M_i$;
P($\Phi$) is prior probability of the shape $\Phi$;
P(p) is the prior probability of the pose p;
P(x) is the probability of pixel location x;
P($\Phi$, p|x, y) is the posterior probability of the shape $\Phi$ and the pose p given the pixel location x and the pixel value y.

3. A method of tracking and segmenting objects in a series of n-D images that have objects appearing in a background comprising using a probabilistic model of the appearance of the objects and of the appearance of the background in the images, and using an evaluation of whether particular pixels in the images are a part of an object or a part of the background, that evaluation comprising determining the posterior model probabilities that a particular pixel or group of pixels belongs to an object or to the background, and further comprising marginalising over these object/background membership probabilities to yield a function of the shape and pose parameters of the objects, where at least the object/background membership is adjudged to be a nuisance parameter and marginalised out;
wherein a processor is configured to perform an evaluation of equation (3) followed by an evaluation of equation (4), wherein:

Equation (3) is:

$$P(M_j \mid y) = \frac{P(y \mid M_j)P(M_j)}{\sum_{\{i=f,b\}} P(y \mid M_j)P(M_j)} \quad j = \{f, b\}$$

and Equation (4) is:

$$P(\Phi, p \mid x, y) = \frac{1}{P(x)} \sum_{\{i=f,b\}} \{P(x \mid \Phi, p, M_i)P(M_i \mid y)\}P(\Phi)P(p)$$

and
i can be either foreground f or background b;
P($M_i$) is the prior probability of the model $M_i$;
P(y|$M_i$) is the likelihood of seeing the pixel value y given the model
P($M_i$|y) is the posterior of the model $M_i$ given the pixel value y;
P(x|$\Phi$, p, $M_i$) is the likelihood of the pixel location x given the shape $\Phi$, the pose p and the model $M_i$;
P($\Phi$) is prior probability of the shape $\Phi$;
P(p) is the prior probability of the pose p;
P(x) is the probability of pixel location x;
P($\Phi$, p|x, y) is the posterior probability of the shape $\Phi$ and the pose p given the pixel location x and the pixel value y.

4. The method of any one of claims 1 to 3 wherein the images are modelled using a bag-of-pixels model.

5. A method according to any preceding claim wherein a probabilistic appearance model, for example a non-parametric distribution, for image values is used.

6. The method of claim 5 wherein the non-parametric distribution comprises:
(i) a colour histogram, or other relative probability, of particular colours appearing in the object and/or
(ii) a colour histogram, or other relative probability, of a particular colour appearing in the background.

7. A method according to any claims 1 to 3 and 4 to 6 comprising using an invertible parametric registration, possibly an invertible linear transformation, of an object between different images (such as a rigid, affine or perspective transformation), followed by segmentation of the object from the background to account for non-rigid shape deformations of the object boundary.

8. A method according to any preceding claim comprising determining the pose of the object in a first image and determining the pose of the object in a second image.

9. A method according to any preceding claim wherein a level-set of an embedding function is used to represent the object shape, and optionally or preferably wherein a prior condition is imposed on the embedding function to constrain it to be an approximate signed distance function.

10. An image tracking system comprising:
(i) a processor adapted to run an image tracking algorithm;
(ii) an input to the processor adapted to receive digital pixel data signals representative of pixels of a series of images having a target and background;
(iii) an output from the processor adapted to output processed signals which are derived from operating on the input signals with the tracking algorithm; wherein the image tracking algorithm uses a probabilistic evaluation of posterior probabilities that particular pixels, or a group of pixels, are pixels of the object or pixels of the background and wherein the tracking algorithm is adapted to marginalise out, over the pixel data processed, at least one nuisance parameter from a model of the object,
wherein an evaluation of equation (3) is made followed by an evaluation of equation (4), wherein:

Equation (3) is:

$$P(M_j \mid y) = \frac{P(y \mid M_j)P(M_j)}{\sum_{\{i=f,b\}} P(y \mid M_j)P(M_j)} \quad j = \{f, b\}$$

and Equation (4) is:

$$P(\Phi, p \mid x, y) = \frac{1}{P(x)} \sum_{\{i=f,b\}} \{P(x \mid \Phi, p, M_i)P(M_i \mid y)\}P(\Phi)P(p)$$

and
i can be either foreground f or background b;
P($M_i$) is the prior probability of the model $M_i$;
P(y|$M_i$) is the likelihood of seeing the pixel value y given the model
P($M_i$|y) is the posterior of the model $M_i$ given the pixel value y;
P(x|$\Phi$, p, $M_i$) is the likelihood of the pixel location x given the shape $\Phi$, the pose p and the model $M_i$;

P(Φ) is prior probability of the shape Φ;

P(p) is the prior probability of the pose p;

P(x) is the probability of pixel location x;

P(Φ, p|x, y) is the posterior probability of the shape Φ and the pose p given the pixel location x and the pixel value y.

11. An image segmenting system comprising:

(i) a processor adapted to run an image segmenting algorithm;

(ii) an input to the processor adapted to receive digital pixel data signals representative of pixels of a series of images having a target and background;

(iii) an output from the processor adapted to output processed signals which are derived from operating on the input signals with the image segmenting algorithm; wherein the image segmenting algorithm uses a probabilistic evaluation of posterior probabilities that particular pixels, or a group of pixels, are pixels of the object or pixels of the background and wherein the segmenting algorithm is adapted to marginalise out, over the pixel data processed, at least one nuisance parameter from a model of the object, wherein an evaluation of equation (3) is made followed by an evaluation of equation (4), wherein:

Equation (3) is:
$$P(M_j \mid y) = \frac{P(y \mid M_j)P(M_j)}{\sum_{\{i=f,b\}} P(y \mid M_j)P(M_j)} \quad j = \{f, b\}$$

and Equation (4) is:
$$P(\Phi, p \mid x, y) = \frac{1}{P(x)} \sum_{\{i=f,b\}} \{P(x \mid \Phi, p, M_i)P(M_i \mid y)\}P(\Phi)P(p)$$

and i can be either foreground f or background b;

P($M_i$) is the prior probability of the model $M_i$;

P(y|$M_i$) is the likelihood of seeing the pixel value y given the model

P($M_i$|y) is the posterior of the model $M_i$ given the pixel value y;

P(x|Φ, p, $M_1$) is the likelihood of the pixel location x given the shape Φ, the pose p and the model,l;

P(Φ) is prior probability of the shape Φ;

P(p) is the prior probability of the pose p;

P(x) is the probability of pixel location x;

P(Φ, p|x, y) is the posterior probability of the shape Φ and the pose p given the pixel location x and the pixel value y.

12. A system according to claim 10 or claim 11 wherein there is a last frame memory adapted to hold data representative of pixels from a last frame, and a current frame memory adapted to hold data representative of pixels of a current frame, and wherein the tracking algorithm is adapted to use data derived from the last frame memory and from the current frame memory to evaluate the boundary between target and background and to update an object model stored in an object model memory, preferably the data representative of the pixels from a last frame comprises a colour histogram probability model of the object and background.

13. A system according any of claims 10 to 12 wherein the system comprises a camera having one or more of a pan, or tilt, or zoom capability, and wherein the output from the processor is used by a camera control mechanism to control one or more of the pan, or tilt, or zoom of the camera automatically, without human intervention, responsive to the processor tracking the object in the images.

14. A method according to claim 1 or claim 2 or claim 3 for tracking of a non-rigid foreground object in a sequence of images having a foreground object in a background, wherein the tracking method uses an optimisation that finds a foreground object region in an image by maximising the discrimination between the foreground and the background by finding the optimal pose (i.e. transformation from the object coordinate frame to the image coordinate frame, such as the image position of the object, or the position, rotation and scale) of the object in the image and wherein in each frame the result of the optimisation is a probabilistic boundary between the foreground and background (e.g. a contour or contours in a 2D), the pose parameters of the boundary relative to the object coordinate frame, and the appearance models of the foreground object and background.

15. A method according to claim 8 or claim 14 further comprising finding local shape deformations not accounted for by the pose transformation.

16. A method according to any preceding method claim further comprising updating the appearance models of both foreground and background.

17. A method for real-time tracking of a non-rigid foreground object in a sequence of images comprising: (i) in a first image of the sequence, identifying the region of an image covered by the foreground object and a background region outside the object, and developing probabilistic appearance models for the foreground object region and the background region; (ii) for the next image in the sequence, for each pixel "i" in the image, computing the probability that it is foreground or background pixel (variable "M"), given a pixel value y, i.e. P(M|y(i)); these values representing the posterior foreground/background membership for every pixel in the absence of any pose or shape information; (iii) using a prediction of the object pose, maximising the probability distribution P(p, Φ|x, y) with respect to the pose parameters p, that distribution representing belief in the pose p of the foreground object, and its shape Φ, given a pixel position x and pixel value y, the maximising of P(p, Φ|x, y) being computed by marginalising over the posterior foreground/background membership probabilities of each pixel in the image, wherein a processor is configured to perform an evaluation of equation (3) followed by an evaluation of equation (4), wherein:

Equation (3) is:
$$P(M_j \mid y) = \frac{P(y \mid M_j)P(M_j)}{\sum_{\{i=f,b\}} P(y \mid M_j)P(M_j)} \quad j = \{f, b\}$$

and Equation (4) is:
$$P(\Phi, p \mid x, y) = \frac{1}{P(x)} \sum_{\{i=f,b\}} \{P(x \mid \Phi, p, M_i)P(M_i \mid y)\}P(\Phi)P(p)$$

and i can be either foreground f or background b;

P($M_i$) is the prior probability of the model $M_i$;

P(y|$M_i$) is the likelihood of seeing the pixel value y given the model $M_i$;

P($M_i$|y) is the posterior of the model $M_i$ given the pixel value y;

P(x|(Φ), p, $M_i$) is the likelihood of the pixel location x given the shape Φ, the pose p and the model $M_i$;

P(Φ) is prior probability of the shape Φ;

P(p) is the prior probability of the pose p;
P(x) is the probability of pixel location x;
P(Φ, p|x, y) is the posterior probability of the shape Φ and the pose p given the pixel location x and the pixel value y.

18. The method of claim 17 further comprising a step (iv) of optimizing P(p, Φ|x, y) with respect to Φ to determine the new object shape.

19. The method of claim 17 or of claim 18, further comprises a step (v) of updating the appearance models by fusing the pre-existing foreground and background appearance distributions with the appearance distributions in the current image.

20. The method of any of claims 17 to 19, further comprising repeating the steps (ii) to (v) for subsequent images in the sequence.

21. The method of any preceding method claim wherein an object location is initialised by a user defining a region, optionally a closed loop such as a ring or an elliptical region, of foreground to define the appearance model if the object and initial object location, the background being acquired by considering a region outside the user-defined region and wherein steps (iv) and (v) are iterated to extract the shape which best separates background from foreground as determined by maximising P(p, Φ|x, y).

22. The method of any preceding method claim wherein the object location is initialised by an automatic detection/recognition module (e.g. a face detector).

23. The method of any preceding method claim wherein the object location in a subsequent image frame is predicted based on its previous location and a model of its expected motion.

24. The method of any preceding method claim wherein a or the optimisation step for the pose p is achieved using Newton-Raphson technique.

25. The method of any preceding method claim wherein a or the optimisation step for the shape Φ is achieved using calculus of variations.

26. The method of any preceding method claim wherein only those pixels are considered that are in a narrow band around the predicted boundary contour separating object from background.

27. The method of any preceding method claim wherein pose parameters are adjusted using closed-loop control to keep the object centered in its original coordinate frame by accounting for drift caused by shape variations.

28. The method of any preceding method claim wherein the appearance models are updated via a weighted running average of the previous model and the current appearance.

29. The method of any preceding method claim further comprising using the best pose parameters p to develop a control signal to control the pose parameters of a robotic device.

30. The method of claim 29 wherein the robotic device is a pan-tilt-zoom camera device and the control signal is intended to keep the object in the field of view of the camera.

31. The method of any preceding method claim where the best pose parameters p are used to provide a control signal to a virtual world or augmented reality sub-system.

32. The method of any preceding method claim where the best pose parameters p are used to extract a stabilised view of the foreground object.

33. The method of preceding method claim in which the images are 3-D, such as MRI or CT, and wherein the probabilistically determined boundary between background and foreground is a surface.

34. The method of any preceding method claim in which the images are 3-D, such as MRI or CT, and the boundary delineates an interior and an exterior of some object of interest.

35. The method of any preceding method claim m which the probabilistic appearance model is given by:
(i) a parametric colour or texture distribution; or
(ii) a histogram.

36. The method of any preceding method claim having a model of the appearance of the background and/or object(s) wherein the model of the appearance of the object(s) and/or the model of the appearance of the background can evolve over time.

37. A visual tracking system for tracking a foreground object in a series of images, that marginalises over a foreground/background segmentation using the posterior probabilities of foreground/background membership of image pixels, and which optimises pose parameters of the object.

38. A computer program encoded on a non-transitory computer-readable data carrier which when run on a computer processor performs the method of any of the preceding method claims.

* * * * *